United States Patent [19]
Langer

[11] Patent Number: 5,511,335
[45] Date of Patent: * Apr. 30, 1996

[54] FISHING LURE

[76] Inventor: Alexander G. Langer, 94 St. Rose St., Jamaica Plain, Mass. 02130

[ * ] Notice: The portion of the term of this patent subsequent to Jul. 13, 2013, has been disclaimed.

[21] Appl. No.: 90,922

[22] Filed: Jul. 13, 1993

[51] Int. Cl.⁶ .................................................. A01K 85/00
[52] U.S. Cl. .................... 43/4; 43/17.6; 43/17.1
[58] Field of Search ................... 43/4, 42, 17.6, 43/17.1

[56] References Cited

U.S. PATENT DOCUMENTS

| | | | |
|---|---|---|---|
| 2,711,044 | 6/1955 | Woods | 43/17.6 |
| 3,031,788 | 5/1962 | Shannon | 43/3 |
| 3,045,381 | 7/1962 | Martin | 43/26.2 |
| 3,123,798 | 3/1964 | Holloway et al. | 340/3 |
| 3,153,297 | 10/1964 | Grabowsky | 43/7 |
| 3,174,127 | 3/1965 | Haslett | 340/3 |
| 3,382,598 | 5/1968 | Wilson | 43/17 |
| 3,763,588 | 10/1973 | Foster | 43/4 |
| 3,879,697 | 4/1974 | Richard | 340/3 D |
| 4,050,180 | 9/1974 | King | 43/27.4 |
| 4,321,854 | 3/1982 | Foote et al. | 87/6 |
| 4,538,249 | 8/1985 | Richard | 367/94 |
| 4,583,313 | 4/1986 | Dugan, Jr. | 43/17.1 |
| 4,584,240 | 4/1986 | Herbert et al. | 428/373 |
| 4,586,284 | 5/1986 | Westwood | 43/17 |
| 4,617,751 | 10/1986 | Johansson | 43/17.5 |
| 4,621,447 | 11/1986 | Rhodes | 43/17.6 |
| 4,697,371 | 10/1987 | Hill | 43/4 |
| 4,779,372 | 10/1988 | Obese | 43/44.89 |
| 4,805,337 | 2/1989 | Kurata | 43/17.5 |
| 4,899,480 | 2/1990 | Park | 43/4 |
| 4,952,344 | 9/1990 | Burgess | 264/40.6 |
| 4,979,153 | 12/1990 | Terry | 367/93 |
| 4,995,009 | 2/1991 | Altmire et al. | 367/107 |
| 5,072,540 | 12/1991 | Monzyk et al. | 43/4 |

FOREIGN PATENT DOCUMENTS

| | | | |
|---|---|---|---|
| 0214060 | 11/1987 | European Pat. Off. | |
| 1201319 | 12/1959 | France | 43/44.98 |
| 5153889 | 12/1991 | Japan | |

Primary Examiner—Kurt Rowan
Attorney, Agent, or Firm—Weingarten, Schurgin, Gagnebin & Hayes

[57] ABSTRACT

A fishing lure for detecting the presence of fish includes a fish attractor and an underwater sensor assembly coupled to the fish attractor. The underwater sensor assembly measures and senses underwater environmental characteristics related to fish catching conditions proximate the lure. The sensor assembly transmits signals corresponding to such factors to an above water circuit which provides an output signal.

19 Claims, 18 Drawing Sheets

FISHING LURE

FIELD OF THE INVENTION

This invention relates to detection systems and more particularly to underwater detection systems.

BACKGROUND OF THE INVENTION

As known in the art, one obstacle to catching a fish using a fishing line having a lure or bait and hook coupled thereto is detecting if and when a fish strikes at the lure or bait. The objective of strike detection is for an angler to take quick action such as "setting" the hook or releasing tension on the line such that the fish may swim away with the lure or bait and not feel the unnatural tension of a fishing line. Once the fish has engulfed, or swallowed the bait and is unaware of any unnatural tension, the hook may be "set." Thus, it is desirable for an angler to detect the presence of a fish near the fishing lure or bait.

As is also known, there exist several techniques to detect a fish strike. One approach to detecting a fish strike is to attach a bobber to the fishing line. The bobber is attached to the fishing line such that the bobber floats on the surface of the water with at least a portion of the bobber in the angler's view. The angler observes the movement of the floating bobber to detect a fish strike. The floating bobber submerges when a fish swallows or strikes at the fishing lure or bait. Thus, after such an indication the angler may set the hook.

Another approach to detect a fish strike is for the angler to observe the movement of the fishing line or fishing rod. That is, the angler observes the movements of the fishing line or the tip of the fishing rod as an indication of a fish strike. Thus, when the angler observes such movement, the angler may set the hook.

Each of the above mentioned strike detection techniques however, requires the transfer of physical energy from the fish's contact with the lure or bait through the fishing line to indicate a strike. The energy propagates along the fishing line through physical movement of the fishing line. That is, the energy mechanically propagates along the fishing line.

However, those strike detection techniques which rely on mechanical propagation of the energy produced by a fish's strike along the fishing line have several problems. First, in some instances the fish may not strike the lure with sufficient energy to cause a physical movement of the fishing line. Thus, an angler would be unaware of the presence of the fish near the lure.

Second, the fish may strike the lure with energy sufficient to move the submerged portion of the fishing line, however, the energy propagating along the submerged portion of the fishing line may attenuate such that no indication above the surface of the water results. That is, neither the bobber, the above water portion of the fishing line or the fishing rod tip move in response to the fish strike. Thus, the angler again may be unaware of the presence of the fish near the lure.

Third, effective mechanical propagation of a fish strike down the fishing line generally occurs only in about one-half of the possible directions in which a fish may strike a lure in the water, for example, if a fish is swimming away from the angler, a strike may generally be detected by observing the movement of the fishing line or fishing rod tip. However, if a fish is swimming toward the angler it is relatively difficult to detect a strike.

Furthermore, environmental factors such as wind blowing on a fishing line results in physical movement of the fishing line which may mimic and mask the movement of the fishing line due to underwater fish strikes. Thus, in such environmental conditions, it is relatively difficult to detect a fish strike.

Moreover, other factors including but not limited to the softness of the fishing line in combination with the stiffness of the fishing rod make detecting fish strikes difficult even under favorable environmental conditions. Further, efficient transfer of mechanical energy along the fishing line requires that a level of tension on the fishing line be maintained between the lure and the angler. This significantly decreases the natural appearance and behavior of the bait. When a fish senses such unnatural bait appearance and behavior due to tension in the fishing line, or when the fish senses pressure in his mouth, the fish may spit out or refuse to strike at the lure.

Thus, suffice it to say that there are several problems with detecting a fish strike.

SUMMARY OF THE INVENTION

In accordance with the present invention, a detection system includes a fish attractor, a sensing device coupled to the fish attractor, a transmission device coupled to the sensor and a detector, coupled to sensing device wherein the detector is disposed above water proximate an angler to receive information from the transmission device. With this particular arrangement, a system to detect the presence of a fish proximate the lure is provided. The fish attractor may be provided for example as a fish lure or bait. The sensing device coupled to the fish attractor alerts the angler to the presence of a fish without the need to risk losing a fish due to unnatural tension in the fishing line. The lack of need to keep a taut line between the angler and the fish attractor to detect a strike will significantly increase the natural look and feel of the fish attractor and reduce the incidence of fish spitting out the fish attractor due to unnatural line tension. The sensing device maximizes the ability of the angler to detect fish strikes which would generally not be detectable using conventional fishing techniques. Thus, the sensing device minimizes the problems in detecting strikes. The sensor assembly may be provided to detect strikes and may also provide information on lure operation and environmental conditions in the region near the lure. Thus, the sensor assembly may act as a data collection system. The system may be used to collect data and may also be used to correct data. The data may then be analyzed and used to alter lure behavior or to provide probability estimates of preferred fish-catching locations and times.

In accordance with a further aspect of the present invention, a fishing lure includes a waterproof housing having at least one sensor device coupled thereto. With this particular arrangement, a fishing lure for detecting the presence of underwater objects proximate the lure is provided. The sensor device may be provided, for example, as an underwater microphone or an underwater camera. The fishing lure may also be used to collect data and transmit or record such data to a receiver. The fishing lure may also include means for underwater locomotion. The fishing lure may also include means to detect and record motion, light, sound, or any other external condition. The fishing lure may also include means for changing behavior, appearance, sound or smell of the fishing lure. Thus the fishing lure may alter or modify its behavior, appearance, sound or smell in response to changing conditions such as environmental conditions surrounding the fishing lure.

In accordance with a further aspect of the present invention, a fishing line includes at least one inner line, for transmission of signals and an outer line, disposed about the inner line. With this particular arrangement a fishing line which may be used as a transmission line over which signals between an underwater device and an above water device may be transmitted is provided. The at least one inner line may be provided as a conductive line and the outer line may be provided either as a braided outer line or a unitary line having a cavity along a central longitudinal axis thereof. The underwater device may be provided, for example, as a sensing device such as a microphone or a camera. The above water device may be provided as a detector or a receiver.

In accordance with a further aspect of the present invention, a fishing reel includes a reel frame and a spool disposed on the reel frame. A housing is disposed on a frontal portion of the reel frame. Disposed in the housing is a receiver circuit and a transmitter circuit. With this particular arrangement, a fishing reel having a transceiver assembly disposed therein is provided.

In accordance with a further aspect of the present invention, a transceiver collar includes a collar having at least one cavity disposed therein. Disposed in the cavity of the collar is a receiver. With this particular arrangement, a transceiver collar which may be removably coupled to a fishing reel is provided. The collar may be provided having a C-shaped cross section and may be provided from a relatively flexible material. The material from which the collar is provided is selected such that the collar is flexible to the extent that the collar may be disposed about a spool portion of a fishing reel. The receiver disposed in the collar receives signals from an underwater sensor assembly disposed in a region near the fishing lure. The receiver may optionally provide such signals to an amplifier disposed in the collar which transmits amplified signals to an output display or other suitably selected output device.

BRIEF DESCRIPTION OF THE DRAWINGS

The foregoing features of this invention as well as the invention itself may be more fully understood from the following detailed description of the drawings in which.

DESCRIPTION OF THE PREFERRED EMBODIMENTS

Figure 1:
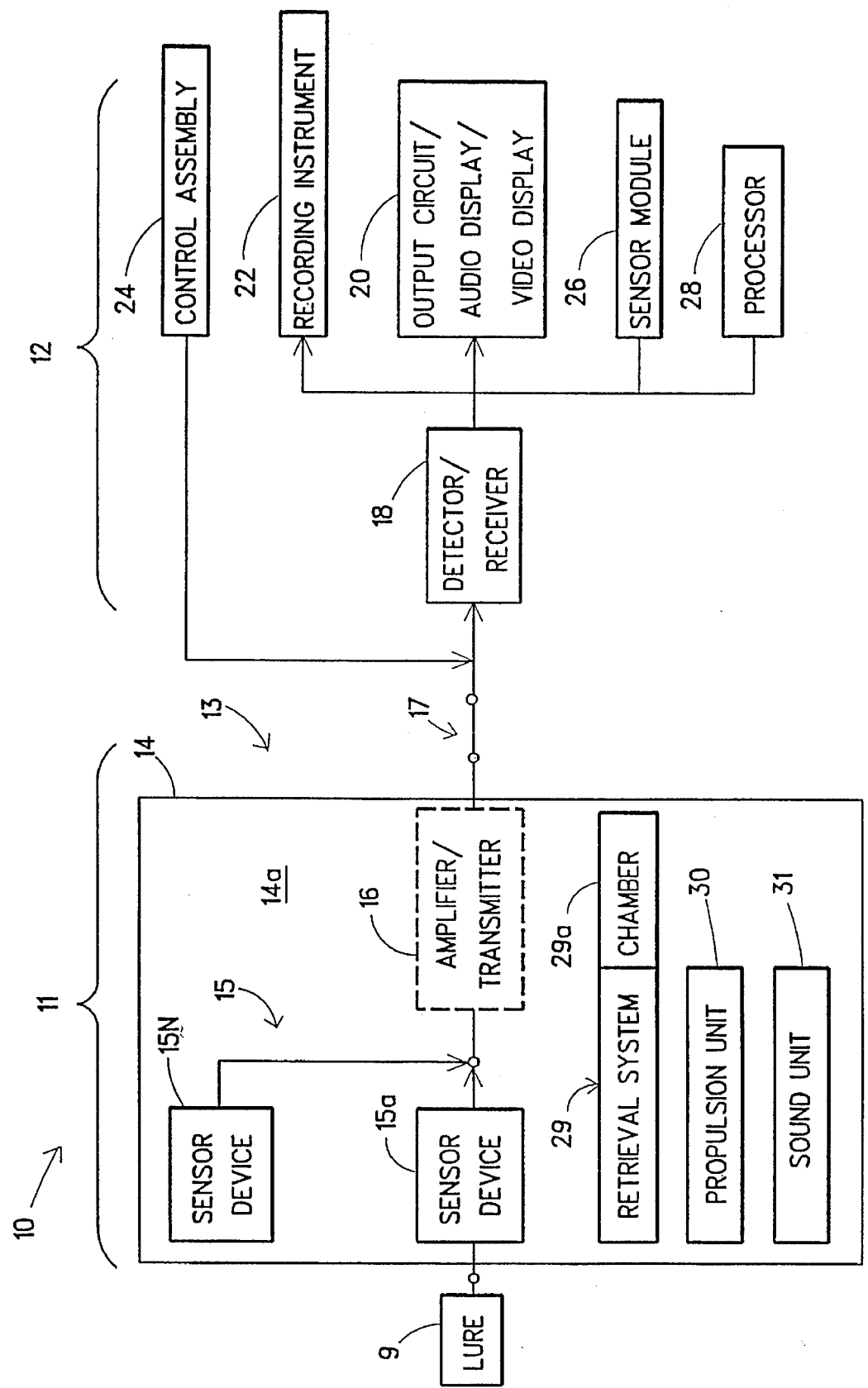
FIG. 1 is a block diagram of an under water detection system.

Referring now to FIG. 1, a detection system 10 includes an underwater portion 11 and an above water portion 12. The underwater portion includes a lure 9 coupled to a sensor assembly 13. The sensor assembly 13 may be provided as a piece separate from the lure or alternatively the sensor assembly may be provided integral with the lure 9.

The sensor assembly 13 includes a waterproof housing 14. One or more sensor devices 15a–15N generally denoted 15 may be disposed in a cavity 14a of the housing 14 or alternatively the sensor device 15 may be disposed on an exposed outer surface of the housing 14. In the case where the sensor device 15 is disposed on an outer surface of the housing 14, the sensor device 15 should preferably be provided as a watertight device and may be coupled to an aperture in a wall of the housing 14 via a conventional watertight seal such as an O-ring type gasket (not shown).

The sensor assembly 13 further includes an amplifier/transmitter assembly 16 coupled to each of the sensor devices 15. The sensor devices 15 sense an underwater event or condition and provide signals to the transmitter assembly 16 for transmission along a transmission medium 17. The transmission medium may be water, or in an alternative embodiment, the transmission medium may be provided as a fishing-transmission line as will be described further below in conjunction with FIGS. 7 and 7A.

The sensor assembly 13 detects strikes and also may provide information pertinent to the operation of the lure 9. The sensor assembly 13 may also sense environmental conditions in the water region proximate the lure. As will be described further below in conjunction with FIGS. 2–5, each of the sensor devices 15 may be provided for example, as an underwater listening or viewing device, or a pressure sensitive device which may be used to gauge depth as a function of water pressure. The sensor devices may also be provided as underwater motion detectors disposed to indicate when the objects near the lure are moving. Regardless of the particular function of a sensor, the sensor may be disposed on, near or inside the fishing lure 9.

Some of the sensor devices 15 may be provided as temperature sensors which may be used to detect thermoclines and to correlate with sonar sensors. Furthermore by disposing temperature sensors on the lure, it is possible to measure actual water temperature at the lure when the lure is cast under docks, weeds, cold/hot springs, into fish spawning areas or any other location in which fish are likely to be present. Furthermore it is possible to detect water locations having water temperatures within preferred temperature ranges.

Such temperature measurements may be correlated with other preferred conditions such as dissolved oxygen content in water, light penetration through the water, etc. . . . to optimize the possibilities of locating a fish.

By providing a sensor device 15 as a light indicator, it is possible to measure the light penetration at the lure. This is advantageous since light is a major indictor of the depth to which fish will migrate. Since light penetration will vary due to time of day, wave action and water clarity it is thus possible to determine the optimum light penetration level at the lure.

Light penetration varies in water depending on what types of particles are suspended in the water, whether it is fresh water or salt water, and the relative clarity of the water. Particular colors of light are more visible than others given color penetration. By correlating color penetration at a predetermined depth, lure color may be chosen more intelligently for the given situation. Thus, by knowing the color penetration at the depth of the lure, the lure color may be appropriately selected to maximize the chance of attracting a fish.

Furthermore, other sensor devices may measure the pH level of the water proximate the lure. The pH at the lure may differ significantly from the pH level at the location of the angler. For example, if the angler is fishing from a boat the pH is generally measured at the boat. The pH level at the location and depth of the lure, however, may be significantly different that the pH level measured at the boat. Thus, it may be relatively important to determine the pH level as close to the lure as possible since the fish are located proximate the lure rather than proximate the angler. Knowing the pH at a given thermocline, or in the area where a fish was caught may be an important correlation factor in forming a fish-catching pattern.

The sensor assembly may further be provided having a speed indicator to indicate the speed at which the lure is travelling through the water or indicating the speed of the lure relative to the water. Speed may be a relatively important factor in repeatedly catching fish. That is, knowing the speed and cadence with which a lure was travelling through the water, before a strike may provide insight as to how fish may be caught in the future. The lure speed may be plotted against time to provide a graph which may be matched with a lure's sound (i.e. a lure's footprint) at various speeds.

Due to variables such as wind, the variable speed of different fishing reels and water currents, it is relatively difficult to accurately determine the speed with which a lure is travelling through the water. With the present invention it is possible to determine the speed with which the lure travels through the water via a measurement performed at the lure. Thus, through direct or indirect measurement the relative speed of the lure in the water may be derived. This may be particularly important during the time in which the angler retrieves the lure. Thus with such knowledge, the angler may precisely vary the retrieve speed of the lure. Furthermore, the angler may be provided with visual displays on a display monitor and thus have overlays on video display screen to match lure retrieve speeds which resulted in an angler catching a fish.

Furthermore, the angler may hold lure stationary in the water and measure the speed of the water-current at different depths, and correlate water-current speeds with other data (e.g. water temperature, light intensity, etc. . . . ) measured at substantially the same depth.

The sensor assembly may further include a beacon assembly. The location of the sensor assembly may be determined through the emission of a beacon signal to one or more transducers mounted below the water line on a boat or to one or more transducers disposed in the water proximate an angler fishing from on shore or standing in relatively shallow water. The transducer proximate the angler indicates the number of emissions per second received from the beacon. Thus, the angler may deduce the range of the lure. Those of ordinary skill in the art will recognize of course that the beacon signal may originate at either the lure or at the boat mounted transducer. Furthermore, the it is not necessary that the transducer be mounted on the boat. Rather the transducer need only be disposed such that it may receive the beacon from the lure or transmit the beacon to the lure.

The lure may also optionally include an internal compass to provide the lure with direction finding information. Thus the lure is able to determine the direction in which it is pointed.

A corresponding compass provided in the above water portion of the system 10 may be correlated with the lure compass to provide the relative position of the lure with respect to the boat or angler location. Such information may then be displayed on a monitor to indicate the position of the lure relative the boat, for example, at all times. Those of ordinary skill in the art will recognize of course that the information may also be displayed on the monitor to indicate the position of the boat relative the lure.

A mercury switch or similar device may be disposed in the sensor assembly 13 to detect the angle of the pitch or roll of the sensor/lure assembly.

The sensor assembly 13 may optionally include a moisture detector which provides an indication of when a lure is in the water. When the moisture detector indicates that the lure is in the water then power is provided to the lure sensors and any other lure electronics. However, when the moisture detector indicates that the lure is in the water then power is removed from the lure sensors and any other lure electronics. Thus, when a lure enters the water, all sensors are activated and measurements begin and when a lure is removed from the water power is shut off thereby deactivating the lure sensors.

The transmitter assembly 16 transmits the signals fed thereto from the sensor devices 15 to a detector assembly 18 in the above water portion 12 of the system 10. The detector assembly 18 receives the signals fed thereto from the below water sensor assembly 13 and provides such signals to an output circuit 20. The outputs circuit 20 may be provided as an audio display (e.g. earphones), a video display (e.g. a video monitor) or any other type of sensory output display. For example, rather than providing the output circuit as an audio/visual output circuit, the output circuit may include a piezo-electric device which provides a physical vibration in response to a signal being fed thereto.

The detector 18 may also provide the output signal to a recording instrument 22 for recording and storage of the signal. The recording instrument 22 may be provided as any type of analog or digital recording instrument well known to those of ordinary skill in the art.

The above surface portion 12 of the system 10 may further include an optional control module 24 for transmitting control signals to the sensor assembly 13. Such control signals may be transmitted by the control module to the sensor assembly 13 through the transmission medium 17.

Such control signals may correspond to locomotion control signals (e.g., servomotor control signals or the like) or alternatively the control signals may instruct the sensor assembly to record sound, video, light information or the like. Alternatively or in addition to the above, the control signals may instruct the sensor assembly to release scent samples, salt samples or the like from the retrieval system 29 or the control signals may instruct the sensor assembly to sample retrieval signals. Thus, data may both be received from and transmitted to the sensor assembly 13.

The sensor assembly 13 may further include a propulsion unit 30. The propulsion unit 30 may be provided as a weedless motor, a vibrating device, moving arms, or by any other means of propulsion. Thus, the sensor assembly may be remotely directed as it is propelled through the water the propulsion unit.

The control assembly may provide commands including but not limited to directional commands such as, forward, reverse, go deeper, go shallower, go left, go right, etc. . . . The controller may also direct the lure through a particular predetermined pattern of movement or other activity. For example, the control assembly may automatically begin moving the lure in a predetermined pattern of movement and at some predetermined period of time the control assembly may direct the lure to release a scent attractor. The lure 9 may be guided under and around obstructions in the water when such obstructions are detected by the sensor assembly 13. Thus, the lure 9 may be visually directed to move through the water to tease a fish, act like prey, act like an injured fish, or avoid tangles. In the past, one could only fish blindly, never knowing exactly what the lure is doing and what may be in its vicinity.

The system 10 further includes an above surface sensor module 26 for recording environmental conditions above the surface of the water. Environmental factors above the surface of the water affect fish behavior and may be integrated via a processor 28 with data collected by the below water sensor assembly.

For example, environmental factors such as barometric pressure, above water temperature and light conditions may be correlated with underwater factors that affect fishing success. For example, one may catch fish under docks only when it is bright outside. Also, time of day and date are important keys to linking success in a particular body of water and species of fish. Also, the weather preceding a fishing trip is important and may be monitored via the sensor module 26. Alternatively, or in addition to the sensor module 26 sensing environmental conditions, such data may be manually input from published or locally sensed data. Thus, the processor allows a user to input such data and also allows comments and annotations to be recorded to describe a particular fishing experience. Such information may be input from a menu format, for example.

The processor may also be used to compute correlations, regression formulae, and conditional probabilities (e.g. Bayesian probability estimates) based on data fed to the processor 28. Thus, by providing the processor with a predetermined set of data and/or conditions, the processor may provide an indication of when an area or which area may have favorable fish catching conditions. Furthermore, the processor may indicate what color lure or type of bait to use, what lure/bait retrieve speed to use, or any other factors which may help maximize the chance of catching a fish.

The sensor assembly 13 may also be provided having a sound module 31. The sound module may be provided, for example, as a miniature speaker. The sound module may emit sound to attract fish or to mimic the sound of bait. Thus, the sensor module may emit any fish-attracting sound.

Sound may be used in conjunction with data provided from sound sensor devices, sonar sensor devices or video sensor devices disposed on the sensor assembly 13. Thus, the sensor devices may be used to observe when, how or at what frequency sound may be used to attract fish. The attractive quality (or lack thereof) of a sound may be noted by observing the reactions of a fish via sonar or video.

Light may be used as an attractor for some species of fish. A controllable light may be used in conjunction with the device which may emit various intensities of various hues of light. Feedback via the sensing apparatus (sonar, video) may be obtained by the angler to monitor fish reactions to various types of light and the fish's interest in it.

The retrieval system may be used to release various types of scent, including salt, natural or synthetic substances, or bleeding-type dyes and scents, which are attractive to fish may be released upon command, under the direction of the angler. Such substances may be in liquid or granular form, and may be released by opening a chamber 29a, or squirting the substances, under pressure from the chamber 29a through a one way valve for example.

Signals provided from the sensing devices 15, which may be provided for example as sonar or video signals, to the angler may allow the angler to monitor fish reactions to various types of scent and bleeding-type substances and the fish's interest in such substances.

The sensor assembly 13 may be used to gather samples of bottom or weeds to identify an object which the sonar, video or sound transmission detects. In such applications, the sensor assembly 13 may be provided having a collection device such as a small suction device, or a robotic arm coupled to the housing 14 to retrieve samples of underwater matter and place such sample in the chamber 29a for storage/analysis and later viewing and/or analysis by the angler.

Figure 2:
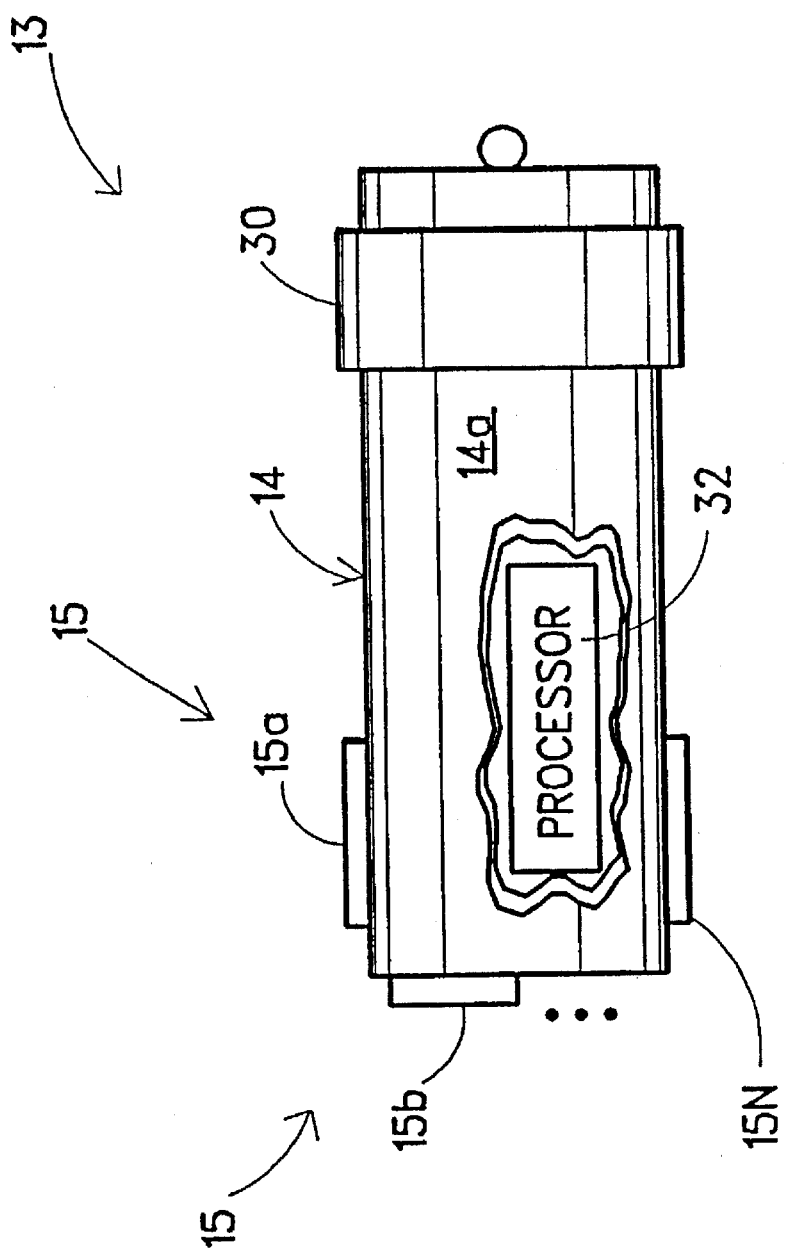
FIG. 2 is a block diagram of a sensor assembly.

Referring now to FIG. 2 in which like elements of the sensor assembly 13 of FIG. 1 are provided having like reference designations, the sensor assembly 13 includes the waterproof housing 14. Disposed on an outer surface 14a thereof are a plurality of sensor devices 15a–15N generally denoted 15.

Also coupled to the housing 14 is the propulsion unit 30 for propelling the sensor assembly 13 through the water. The propulsion unit 30 may be provided for example as a bladder 30 which may open and close to accept and dispel water. When the bladder 30 opens and thus fills with water the sensor assembly 13 becomes less buoyant and thus sinks. However, when the bladder 30 dispels water the sensor 13 assembly becomes more buoyant and thus rises.

In addition to or in place of the bladder 30, the propulsion unit 30 may be provided having a propeller type assembly, to thus propel the sensor assembly 13 in lateral directions through the water. Furthermore, in addition to or in place of the bladder and propeller assemblies, the propulsion unit 30 may also be provided having appendages which move to propel the sensor assembly 30 through the water.

Here a portion of the housing 14 has been removed to reveal an optional a processor assembly 32. The processor 32 may be used to control sensor functions including but not limited to movement, recording of data, etc. . . . For example, the processor may direct the movement of the sensor assembly 13 such that the sensor assembly 13 and any lure or bait coupled thereto, imitates the movements of a particular type of fish.

Figure 3:
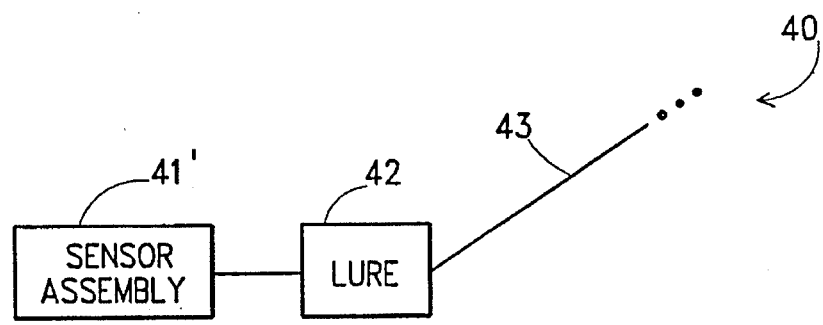
FIG. 3 is a block diagram of a sensor/lure assembly.
Figure 3A:
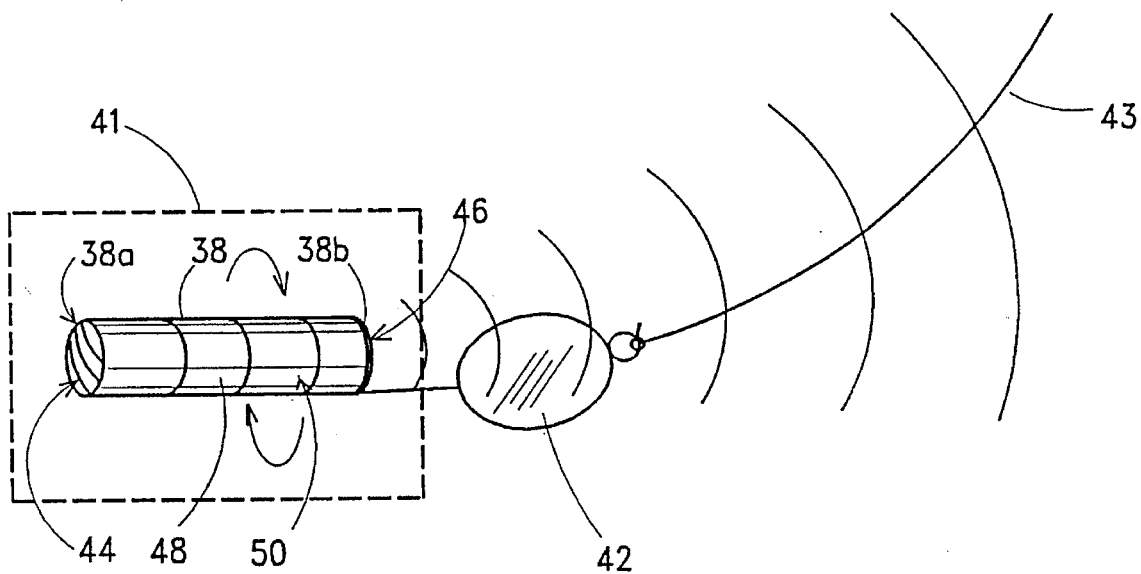
FIG. 3A is a diagrammatic view of a sensor/lure assembly.

Referring now to FIGS. 3 and 3A in which like elements are provided having like reference designations a detector/ lure assembly 40 includes a separate sensor assembly 41 coupled to a lure 42. Here, the lure 42 is coupled via a fishing line 43 to a fishing rod (not shown) or other fishing device as is generally known.

Referring now to FIG. 3A, the sensor assembly 41 includes a waterproof housing 38 having first and second opposing ends 38a, 38b. A microphone sensor 44 to sense underwater audio signals is disposed on a first end 38a of the housing 38. The microphone 44 is disposed such that any contact of the lure 42 with a fish or other object may be detected and transmitted to the angler. A speaker 46, which may include an ultrasonic transducer, piezo electric transducer or the like, is disposed on the second end of the housing 31 and transmits signals to the detector 18 (FIG. 1).

The waterproof housing 38 includes a pair of waterproof cavities. In a first cavity is disposed a power source 48 which may be provided as a battery, for example. In the second cavity is disposed an amplifier assembly 50 which receives signals fed thereto from the microphone 44 and transmits such signals to the detector 18 via the speaker 46.

In one embodiment, the speaker 46 transmits signals having a frequency in the ultrasonic frequency band. In such an embodiment, the amplifier assembly 50 may be provided as a mixer preamplifier assembly. Thus, the signals having a frequency in the audio frequency band detected by the microphone 44 and fed to the mixer preamplifier assembly 50 are frequency translated to a frequency in the ultrasonic frequency range. The ultrasonic frequency signals may then be transmitted to a detector (not shown) via the speaker 46. The ultrasonic frequency signals may be directly transmitted through the water or through a transmission/fishing line which may, for example, be of the type described below in conjunction with FIGS. 7 and 7A.

The microphone 44 detects physical contact of the fish with the lure as the fish touches the lure. The fish produces a distinctive sound when swallowing. Thus an angler may recognize such a sound and thus be apprised of the presence of a fish. An angler may become adept at listening to such sounds by listening for example, to recordings of fish sounds on an audio cassette or other recording media. Moreover, if the lure is not in motion and is resting on the bottom surface of the water or is floating in the water, any contact of an object with the lure has a relatively high probability of being a fish.

The microphone 44 may also detect the contact of the lure with elements other than fish in the water such as, the bottom, rocks, weeds, trees and so forth. The sound of contact with each of these objects is different and thus may be identified with practice, or by providing the corresponding electrical signals to the processor 28 (FIG. 1) for post processing and identification.

The microphone 44 may also provide information to the angler about the sound and/or cadence of the action of the lure 42 in the water. For example, if the cadence of a crankbait is broken by a weed, the angler may detect such a condition and take corrective action by retrieving the lure 42 and clearing the weeds from the lure.

Figure 4:
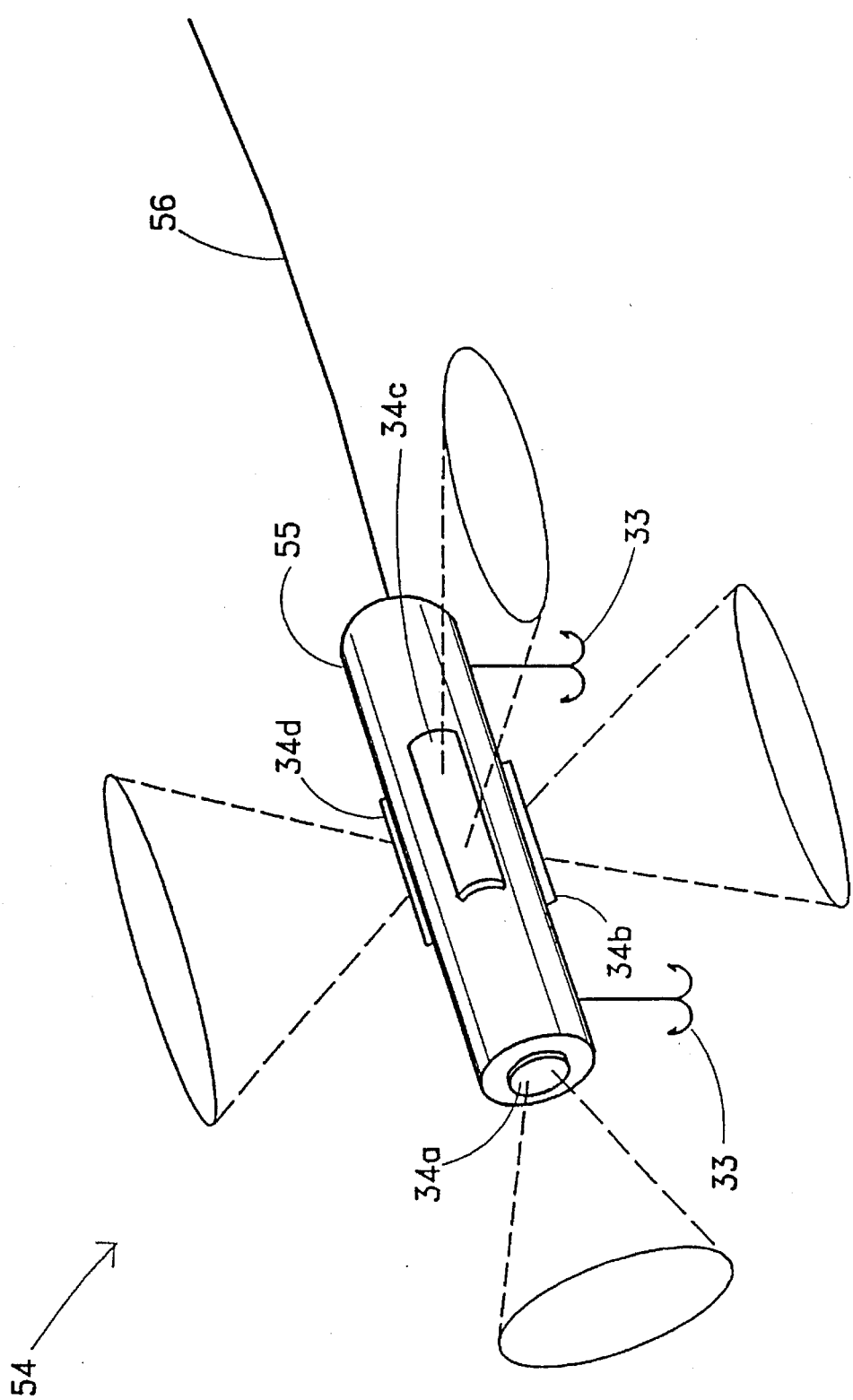
FIG. 4 is a perspective view of an integrated lure/sensing assembly.

Referring now to FIG. 4, an integrated lure/sensing assembly 54 includes a waterproof housing 55 having a plurality of hooks 33 and a plurality of sensor devices 34a–34N generally denoted 34 disposed thereon. Here each of the sensors 34 are disposed in predetermined positions on the housing 55 such that each of the sensors 34 detect the presence of an object such as a fish in predetermined direction. Thus, depending upon which one of the plurality of sensors 34a–34N provides a signal, the angler may identify in which direction an object is detected It should be noted that each of the sensors 34a–34N need not be identical. For example, sensor 34a may be provided as a video sensor, such as a camera adapted for underwater use, while sensors 34b–34d, for example, may be provided as audio sensors such as microphones adapted for underwater use.

The data may be transmitted from each of the sensors 34 to the receiver with or without a transmission line. In a wireless transmission system, the microphone 44 may be coupled to an ultrasonic transmitter, or other wave-emitting device, which transmits signals through the water to a receiver/transducer. The signals may be sent in either digital or analog format. Once received by the transducer, the signals may be amplified and transmitted to a headset or other output device such that the angler may hear, see, feel, etc., the transmitted sounds. The transmission method through the water is preferably accomplished by signals which are undetectable by fish (e.g. signals having ultrasonic frequencies).

In those applications in which a transmission line is used, the microphone may be coupled to the amplifier via a conductive wire, or other conductor, which is embedded in the fishing line. Those of ordinary skill in the art will appreciate of course that alternatively a video sensor, sonar sensor or any other type of sensor may also be coupled to the conductor embedded in the fishing line.

In an alternate embodiment, a fiber optic transmission line may also be used.

An amplifier/radio transmitter may be located in or on the fishing reel to transmit the sound via radio waves, to a receiver/amplifier located on the angler's person, or any other above-water location. The receiver amplifies the sound for the angler to hear.

The sensor device 34 may also be directly connected to the above surface receiver through a transmission line. A first end of the transmission line is coupled to the sensor and a second end of the transmission line is coupled to a fishing reel. The fishing reel may be provided as either a so-called spinning reel, a so-called level wind reel or any other type of fishing reel. Fishing reels adapted to receive such fishing/ transmission line will be described further below in conjunction with FIGS. 8 and 9. Suffice it here to say that such reels include detectors which detect signals fed from an underwater sensor through the fishing/transmission line to the fishing reel.

Figure 4A:
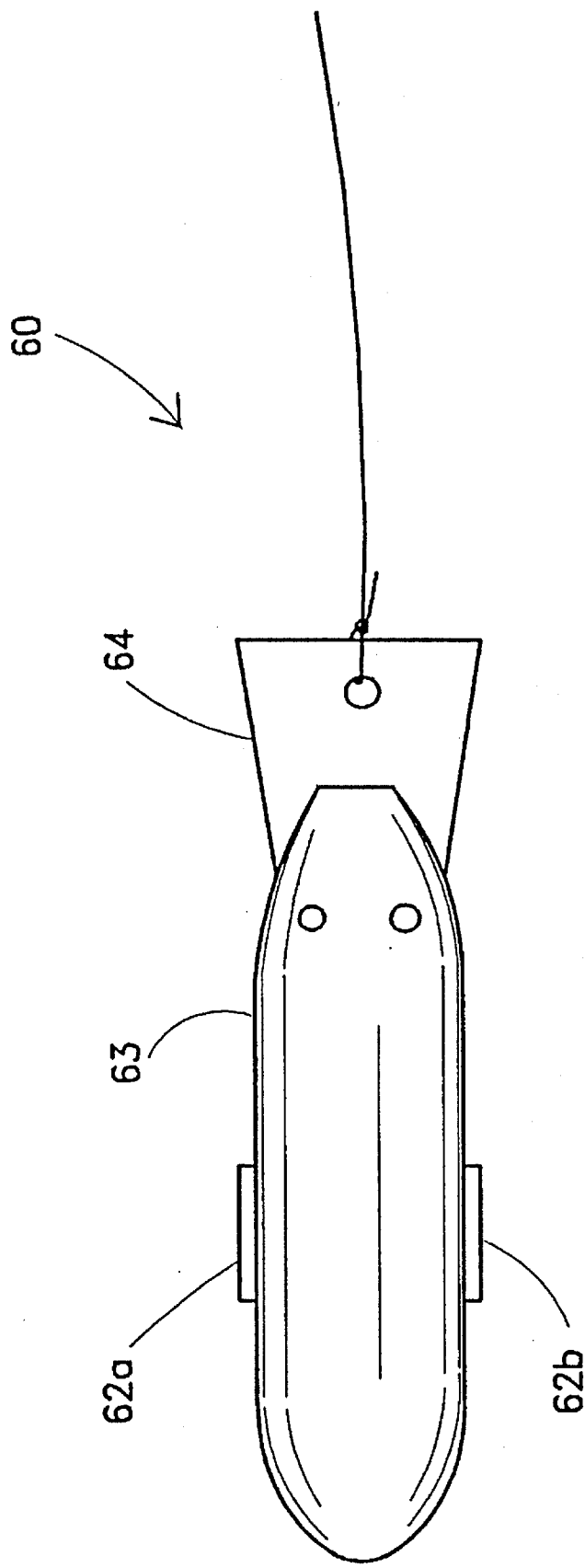
FIGS. 4A–4D are a series of views of fishing lures having integrated detectors therein.

Referring now to FIG. 4A, a fishing lure 60 includes a pair of microphones 62a, 62b disposed on a housing 63. The microphones 62a, 62b are disposed on opposite sides of the lure to provide a stereo sound receiving system. A plurality of microphones may be disposed on the lure 60, to provide directional sound detection and to thus augment the usefulness of the lure 60.

The direction from which a fish takes the lure 60, the side on which the lure contacts bottom obstructions or weeds and stereophonic detection of ambient noises underwater are possible by disposing a plurality of microphones 62 on the lure. The lure 60 may further include parabolic shaped sound reflectors or other sound enhancement/amplification devices to further increase the sensitivity of the of the microphones 62.

Furthermore, it may be desirable to "tune" the microphones 62a, 62b to detect a particular sound footprint. By feeding signals from the microphones to a viewing screen and viewing such signals on the viewing screen, a user may be able to detect minute variations between wood and plastic plugs, plastic worms, and so forth. That is, since different lures provide different types of sounds, sound signatures or footprints detected by more than one microphone allow a user to determine which lure to use based in the sound signatures of other lures which have worked in the past. Thus, the angler is able to select a particular lure based on vibration patterns rather than color. Since the same lure made of different material makes a different sound in the water, this may be an especially advantageous approach in aiding the angler in the selection of a particular type of lure.

Figures 4B, 4C:
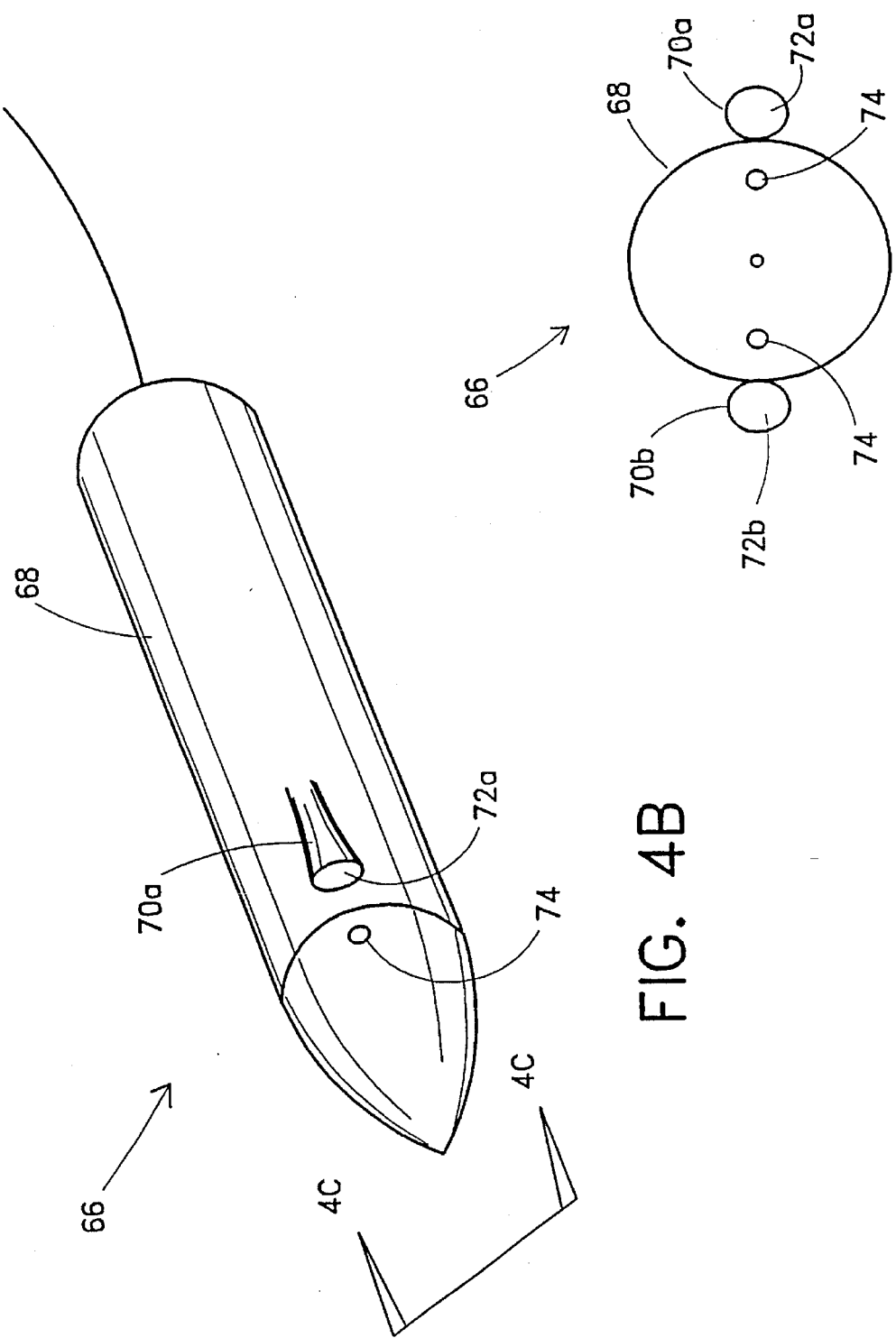

Referring now to FIGS. 4B and 4C in which like elements are provided having like reference designations, a fishing lure 66 includes a housing 68 having a pair of underwater cameras 70a, 70b disposed in a cavity thereof. Each of the cameras has a lens 72a, 72b exposed through the housing 68 to provide the corresponding camera 70a, 70b having a predetermine field of view.

Alternatively, the camera 70 may be disposed on the housing 68 of the fishing lure 66. The cameras 72a, 72b allow the angler to visually observe the environment about the lure 66 in a predetermined field of view. Thus, the angler is able to observe fish trailing the lure 66, the underwater landscape looks like, and other underwater conditions thereby augmenting the angler's ability to detect fish strikes.

The cameras 72a, 72b may be used in conjunction with one or more light sources 74 mounted on or near the camera 72 to illuminate the underwater surroundings in the camera's field of view. The light sources 74 may be provided by lamps coupled to a power source in the lure 66. Alternatively the light source 74 may be provided by exposing the end of a fiber optic cable through the housing for example.

Here illumination is provided by a pair of fiber optic cables which are coupled to the lure. A first end of the fiber optic cable is coupled to a light source which may be provided as an above or below water surface light source. A second end of the fiber optic cable is coupled to the lure. Here, the second end of the fiber optic cable is exposed through a surface of the lure in a region proximate the camera. In an alternative embodiment, the second end of the fiber optic cable may be coupled along the surface of the lure or simply trailing along proximate the lure. The fiber optic cable illuminates the region in which the camera is directed.

A remote controlled switch may be used to turn the light source on and off and to control brightness and/or hue of the light provided by the light source. Thus the light intensity and color may be controlled and selected. Therefore the angler may selectively illuminate the underwater surrounding about the lure and provide such illumination in a predetermined intensity and color. For example, the angler may select a light intensity and color which does not frighten the fish and which may attract fish.

The ability to see underwater without the use of light yields similar benefits. An infrared camera mounted at the same place as the optic camera (alongside or instead of it) will yield results by showing temperature variations in the water. Fish are generally of a slightly higher temperature than the ambient water and may therefore be detected in such a manner. The infrared image may be used to enhance the optical image via post-processing or may be used instead of it.

Low light and night-vision type cameras may also be used for underwater conditions which often tend to be low light.

Multiple cameras may be used for a variety of purposes including the generation of 3-dimensional images which may be transmitted back to the angler. For example, the two cameras 74 mounted as shown may provide a 3-dimensional image. Similarly a pair of sonar sensors may be mounted on the lure 66 to provide 3-dimensional data. Alternatively, or in addition to 3-dimensional imaging or data collection, multiple cameras or sonar sensors may be disposed on the lure 66 to provide viewing or sonar sensing in all directions. A turret mount may allow any camera to have omnidirectional viewing such a turret mount will be described further below in conjunction with FIG. 4D. Suffice it here to say that such a mount may be remotely controllable by the user or alternatively may simply be provided as a continuously moving mount.

The video images may be displayed for the angler via a portable TV or liquid crystal diode (LCD) screen which is attached to the fishing rod, boat, or is completely detached. The images may also be stored on tape or digitally on computer disk or other storage medium. These images may be later reviewed or integrated realtime via a processor and matched to other factors and data which were/are recorded at the time the images were/are recorded. The images may be digitally enhanced for clarity or combined and synchronized for a 3-dimensional image using dual image TV eyeglasses which display the output of both cameras. Other 3-D or overlay enhancement display options are also possible. For example, an infrared image provided by an infrared (IR) sensor may be digitally displayed over a corresponding a video image. Thus, the user may have a plurality of corresponding sensor signals displayed on a single display.

The video image may be transmitted to the angler using either a transmission line or a nontransmission line technique as described above in conjunction with FIG. 1 above.

By providing the lure 66 having a video system 74 and a locomotion means as described above in conjunction with FIG. 2, the lure 66 may be provided as a remotely guided fishing lure 66. Thus, it is possible to guide the lure 66 and direct the lure to a predetermined underwater location or to avoid underwater obstacles for example.

Figure 4D:
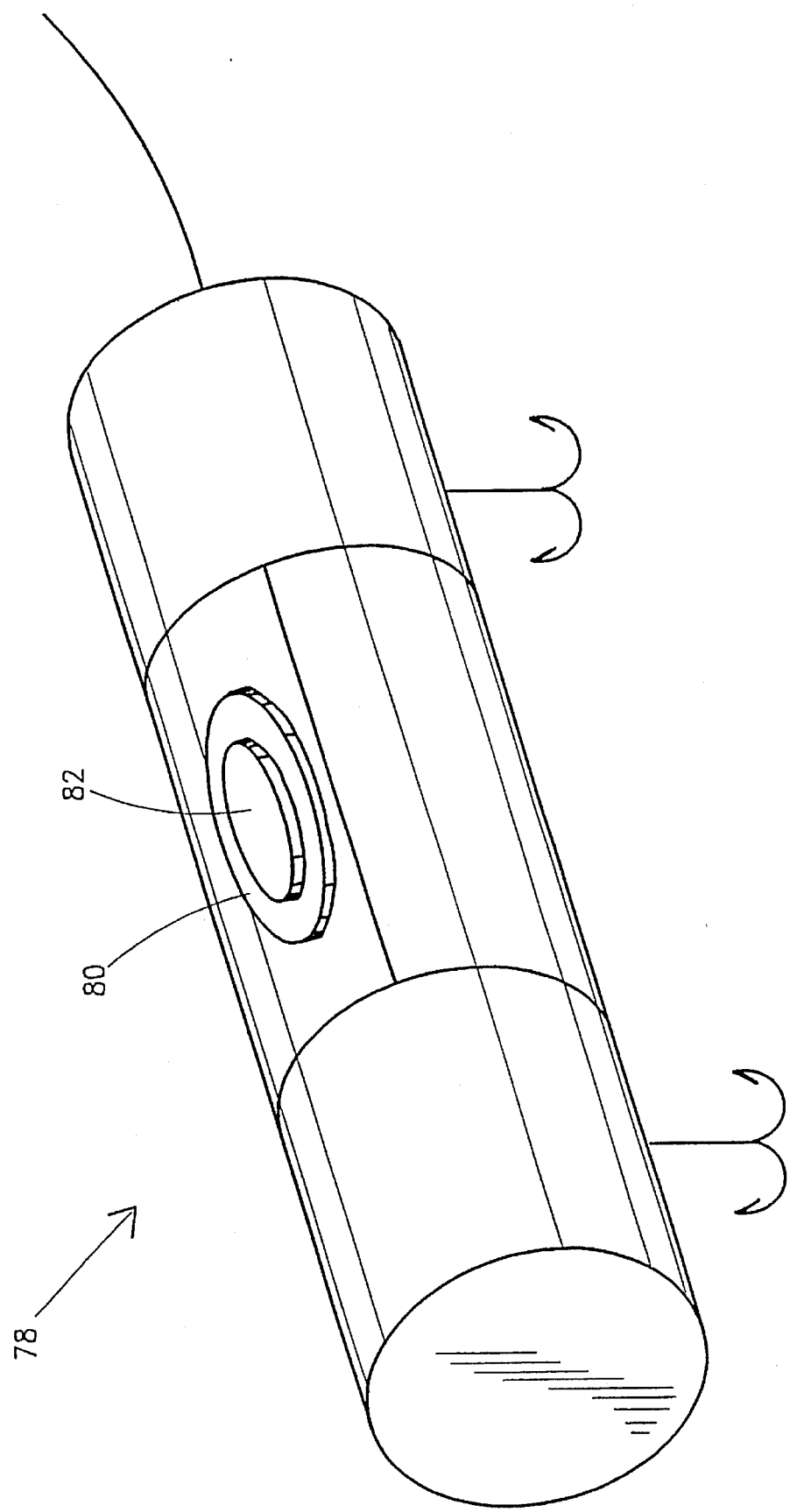

Referring now to FIG. 4D, a lure 78 includes a rotatable turret 80 having a transducer 82 mounted thereon. The turret 80 may be used to turn the transducer 82. The turret mounted transducer 82 may be rotated for example, to scan for fish, bottom obstructions and other underwater items. The transducer 82 may be provided as any type of sensing device described above in conjunction with FIGS. 1–4C above. It should be noted that the sensors may include enhancement features. For example, when the sensors are provided as microphones, it may be desirable to provide a parabolic or other shaped surface about the microphone to enhance the sensitivity of the microphone to sounds in the region of the lure.

It should also be noted that the turret 80 may also be provided such that it may move in a circumferential direction along the surface of the lure. Thus, by via the rotation of the turret 80 and movement of the turret about the surface of the lure, the transducer 82 is able to sense environmental conditions in all directions about the lure 78.

Figure 5:
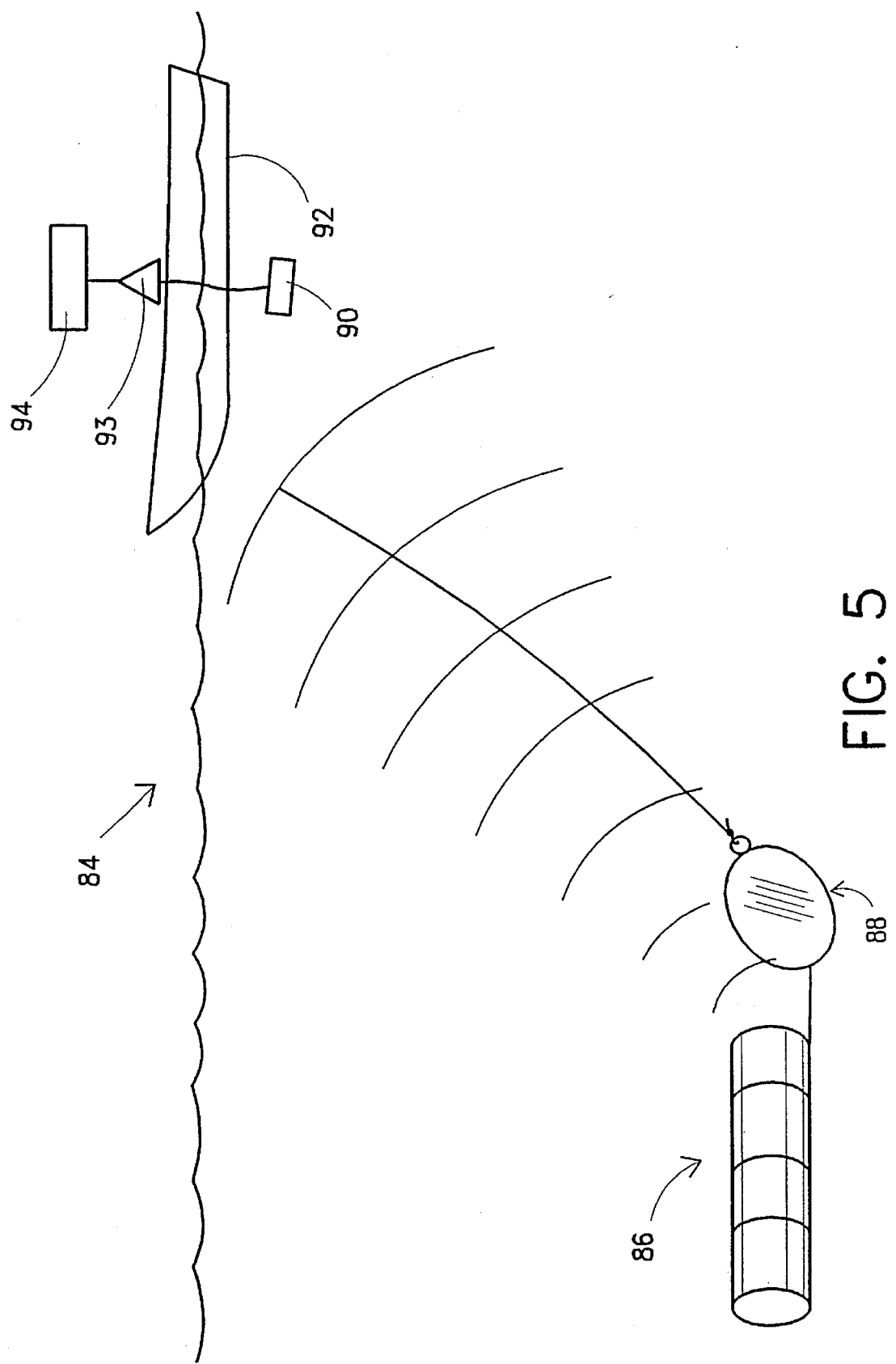
FIG. 5 is a diagrammatic view of a fish detection system.

Referring now to FIG. 5 an underwater detection system 84 includes a sensor 86 coupled to a lure 88. The sensor 86 here transmits signals through the water to a detector 90 disposed on a below water surface of a boat hull 92. Alternatively, the detector 90 may be disposed on a first end of a tube, a line, a retractable wire or a clip-on belt which may be suspended over the side of the boat to thus place the detector in the water.

The detector 90 receives the signals provided by the sensor 86 and provides such signals to an amplifier 93. The amplifier 93 provides amplified signals to an output circuit 94. The output circuit 94 may be provided as a visual display, a headset or any other device which may provide a sensory indication to an angler in the boat.

Figure 6:
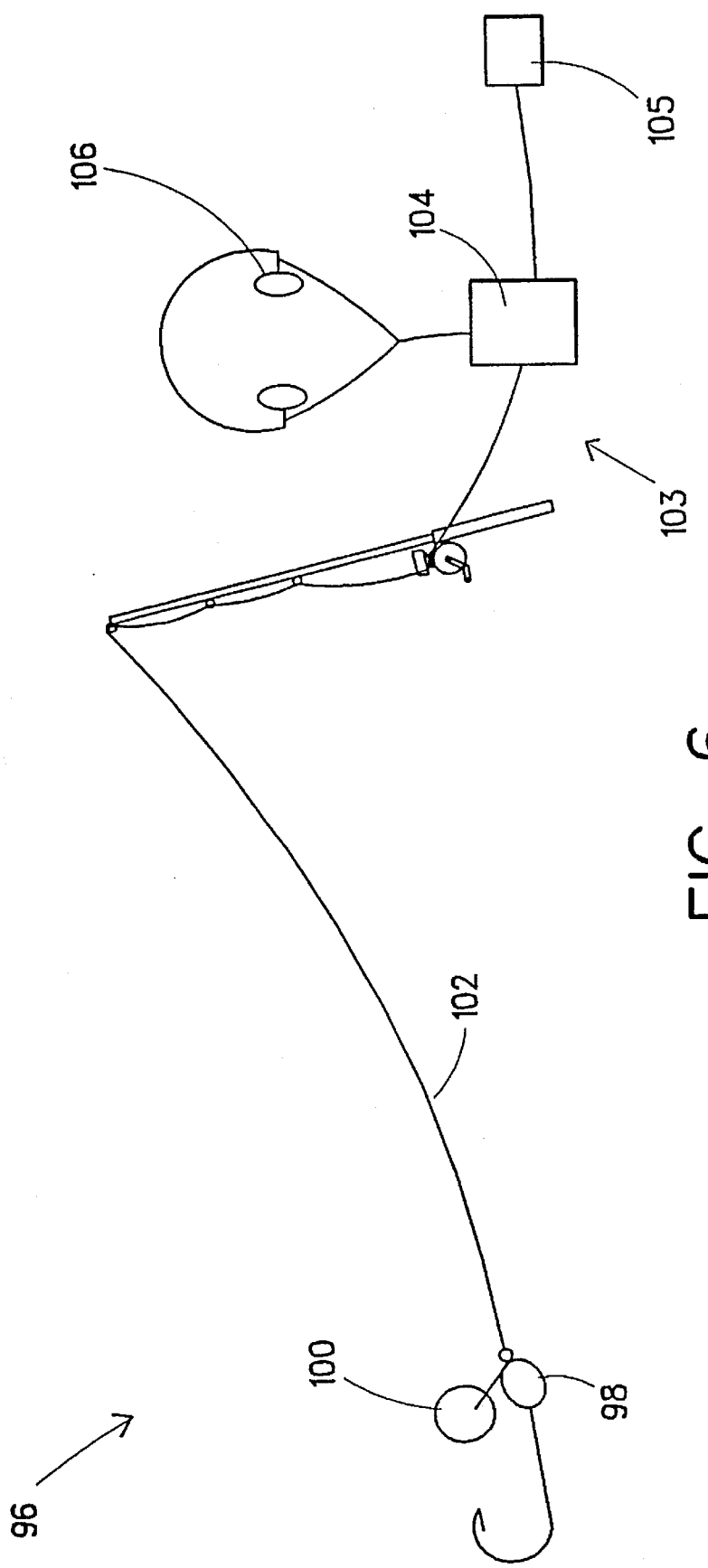
FIG. 6 is a diagrammatic view of a detection system having a transmission line between the detector assembly and a receiver.

Referring now to FIG. 6, a detection system 96 includes a fishing lure 98 coupled to a sensor device 100. The sensor device 100 may be provided, for example, as a microphone. The microphone 100 provides signals to an amplifier 104 via a transmission line 102. The amplifier 104 is coupled to a power source 105 and provides the signals fed thereto to a set of headphone speakers 106. Thus, the detector system 96 includes a hardwired transmission path 102 coupled between the sensor device 100 and the headphone speakers 106.

The transmission line 102 may be provided as a fishing-transmission line 102. The fishing-transmission line 102 will be described further in conjunction with FIGS. 7 and 7A below. Suffice it here to say that the sensor device 100 transmits signals from a first end of the fishing line 102 to the amplifier 104 coupled to a second end of the fishing/transmission line 102.

The second end of the fishing transmission line 102 is coupled through a fishing reel 103 and then coupled to the amplifier 104. The fishing reel 103 may be provided as one of the types described below in conjunction with FIGS. 8 and 9.

Figure 7A:
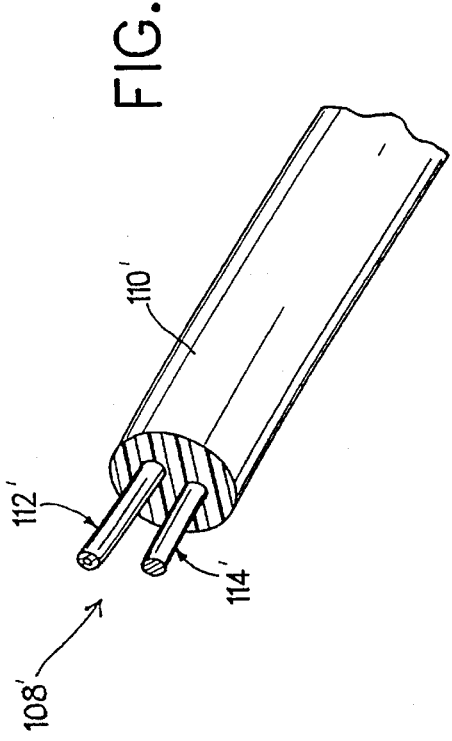
FIG. 7A is a perspective view of a fishing/transmission line having a unitary outer line.
Figure 7:
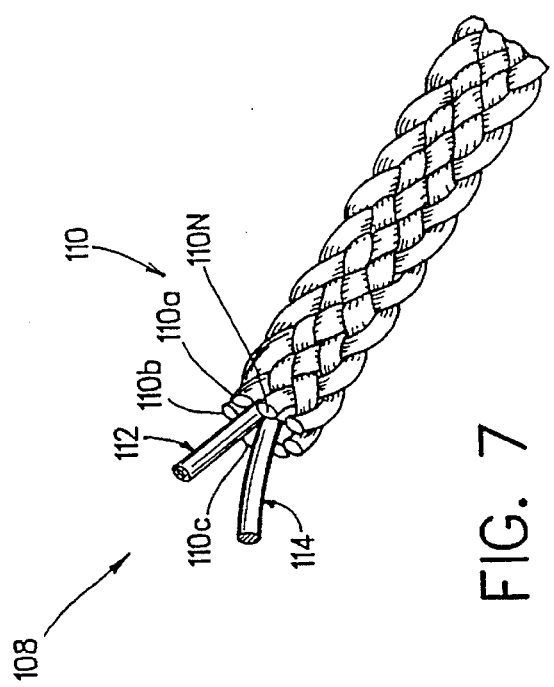
FIG. 7 is a perspective view of a fishing/transmission line having a braided outer line.

Referring now to FIG. 7, a fishing-transmission line 108 having a cross sectional diameter typically in the range of about 0.010 inches to 0.250 inches includes a braided outer line 110 provided form a plurality of braided strands 110a–10N. The braided outer line 110 is here disposed about a first inner line 112 and a second optional inner line 114. The first inner line 112 is he provided as a conductive shielded wire having a diameter typically in the range of about 40 gauge to 22 gauge. Alternatively the inner line 112 may be provided as an unshielded wire. Such wire may be selected to be suitable for transmission of signals in the audio or ultrasonic frequency range provided from a sensor assembly 13 (FIG. 1). The wire should also be an appropriate transmission media for control signals which may be transmitted from the control assembly 24 to the sensor assembly 13 as described above in conjunction with FIG. 1.

Although here only two wires are shown, it should be appreciated that any number of wires required for the transmission of control and data signals or to provide strength to the line may be disposed within the outer line.

Alternatively, the first inner line 112 may be provided as a fiber optic cable along which a fiber optic signal may be transmitted.

The outer braided line 110 may be provided from any suitable material such as nylon, Dacron or no-stretch SPECTRA or KEVLAR or from any other material from which fishing lines may be fabricated. The outer braided line thus forms a protective outer shell of the fishing-transmission line.

The first inner line 112 typically is able to stretch less than the outer braided cable 110. Thus, the optional second inner line 114 is provided to prevent the fishing-transmission line 108 from stretching past the breaking point of the first inner line 112.

The second inner line 114 is therefore preferably provided from any material having sufficient strength to prevent the fishing-transmission line from stretching past the breaking point of the first inner line. Thus, the second inner line may be provided for example from KEVLAR or SPECTRA or any other suitable material well known to those of ordinary skill in the art. It should also be noted that one or more of the woven strands 110a–110N may be provided from KEVLAR or SPECTRA to prevent the line 110 from stretching. Thus while some of the strands 110a–110N of the line may be provided from nylon or like material, the remaining strands may be provided from a non stretch material such as KEVLAR or SPECTRA.

The fishing-transmission line 108 may be manufactured by disposing a single or a plurality of inner lines 112 within a group of outer lines 110a–110N which are to be braided to form the outer braided shield 110. The outer lines 110a–110N may then be braided to form the fishing-transmission line 108.

It should be noted that in some instances depending on a variety of factors including but not limited to the thicknesses of the inner lines 112, 114 and outer lines 110a–110N, it may be possible to provide one or more of the outer lines 110i from a material having stretch coefficient less that the stretch coefficient of the fist inner line 112. It is preferable to limit the stretch of the wire or wires over which signals are to propagate to less than 15% of its total length. Thus, in this case, the second inner line 114 may be omitted.

Referring briefly to FIG. 7A, a fishing-transmission line 108' here includes an outer line 110' having a unitary construction and having for each inner line 112' and 114' a corresponding bore along a longitudinal axis thereof. The inner lines 112' and 114' may be provided as described above in conjunction with FIG. 7.

Alternatively, the outer line may be provided having single bore along a longitudinal axis thereof and having a diameter selected such that a plurality of inner lines may be disposed in the longitudinal bore.

Figure 8:
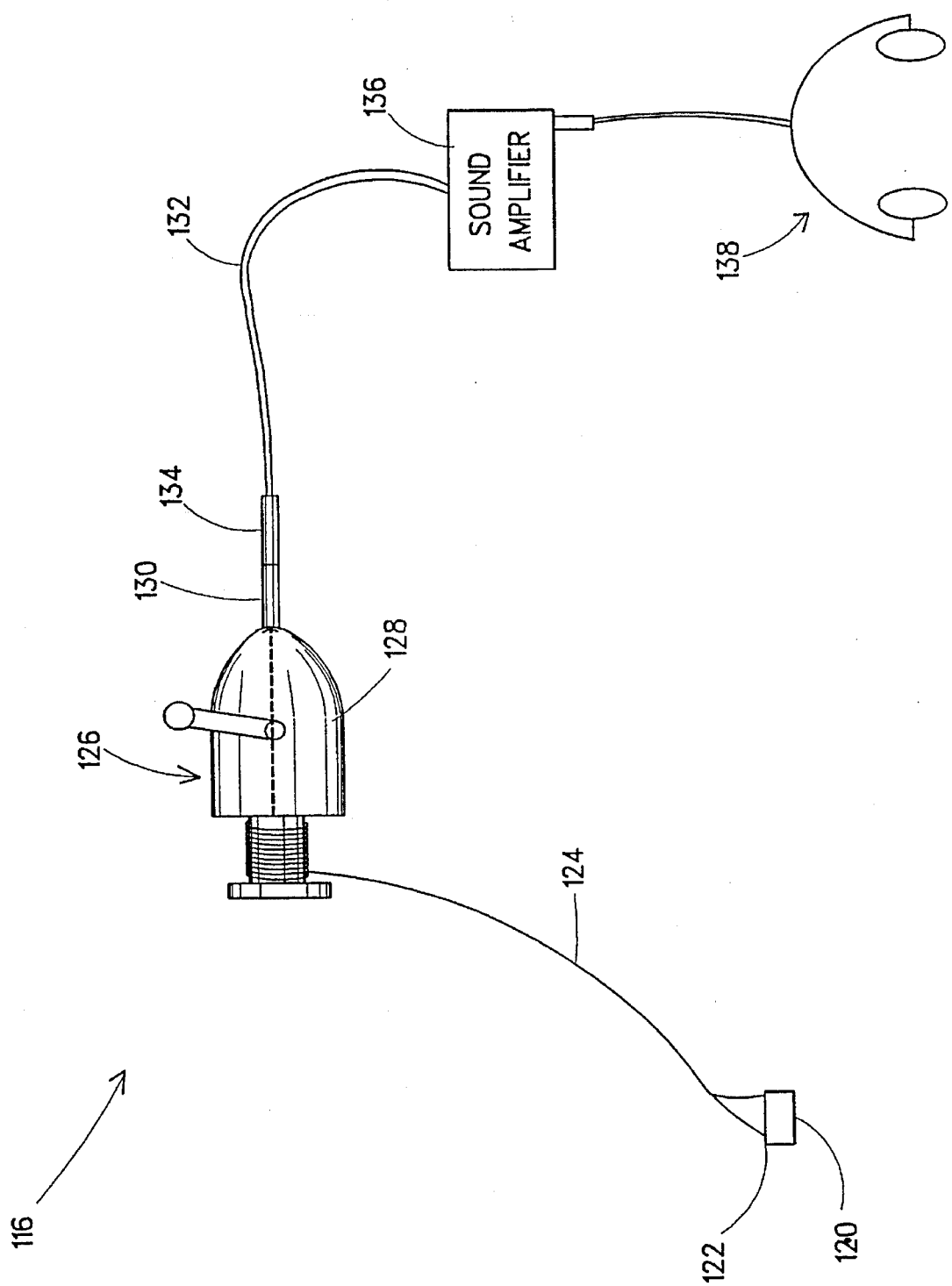
FIG. 8 is a diagram of a fish detection system including a casting reel.

Referring now to FIG. 8, a detection system 116 includes a microphone 120 disposed in a sealed microphone housing 122 which may be disposed in a lure (not shown) for example. The microphone 120 is coupled to a first end of a conductive line 124. A second end of the conductive line 124 is coupled to a fishing reel 126. Here, the fishing reel 126 is provided as a spinning type fishing reel, alternatively however, the reel may be provided as any type of fishing reel including but not limited to a level wind reel or a fly fish reel. The fishing reel 126 is adapted to accept the conductive line and allow it to pass through the reel housing 128 and terminate in a reel connector 130 without tangling.

The reel connector 130 may be provided as a jack or plug type connector which may be of the coaxial type for example. A cable 132 has on a first end thereof a cable connector 134 selected to mate with the reel connector 130. A second end of the cable is coupled to an input port of an amplifier module 136.

The amplifier module 136 amplifies signals fed thereto from the microphone 120 and feeds such amplified signals to an output device 138 here provided as headset. The amplifier module may be disposed in any convenient physical location, and as will be described further below, the coaxial cable 132 may be omitted and the conductive line 124 may be fed directly to the amplifier module 136 for amplification.

The output device 138 is here provided as a headset to be worn by the angler. Those of ordinary skill in the art however will recognize that any audio output device such as a speaker or the like may be used. Alternatively, the output device may be provided as a video display, or a vibration device.

As will be described further below in conjunction with FIG. 9, in a level-wind type fishing reel, since the spool rotates about a central axis thereof, a slip-connection may advantageously be provided which allows the spool to spin and connects the conductive line 124 to the amplifier 136. A slip-connection may also be used for other types of fishing reels such as revolving spool reels including but not limited to baitcasting reels and fly reels.

In those applications where a spinning reel is used, the conductor may be coupled to the amplifier through either a slip or a non-slip connection. A slip connection may be used to allow the so-called drag mechanism to be operative.

Figure 9:
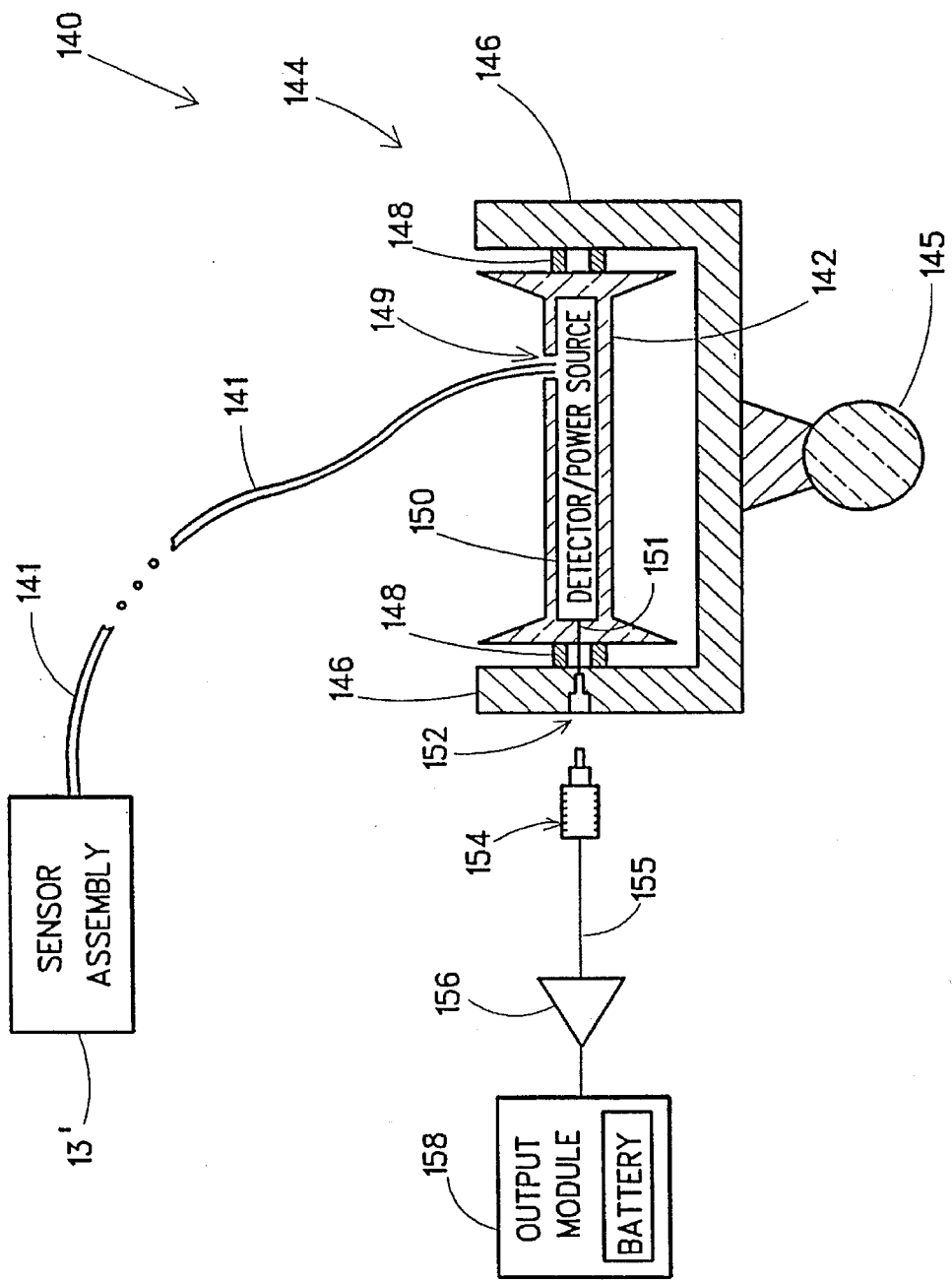
FIG. 9 is a fish detection system having a detector/power source disposed in a fishing reel.

Referring now to FIG. 9 a detection system 140 includes a sensor assembly 13' having an output port coupled to a first end of a fishing-transmission line 141. The fishing-transmission line may be one of the types described above in conjunction with FIGS. 7 and 7A. A second end of the line 141 is coupled to a spool portion 142 of a spinning reel 144 disposed on a fishing rod 145.

The spool 142 is provided having a cavity region disposed therein. The spool 142 is rotatably coupled between two arms of a reel frame 146 via sleeves 148.

In the spool cavity region is disposed a detector assembly 150. The detector assembly 150 includes a detector and optionally may also include a power source which may be provided as a battery for example. The second end of the line 141 is fed through a bore 149 in the spool 142 and is coupled to an input port of the detector assembly 150. An output port 151 of the detector assembly 150 is coupled to a female jack 152 here disposed through the reel side-arm 146 of the reel frame.

A mating plug 154 and corresponding wire 155 couple the detector assembly 150 to an amplifier 156 and an output circuit 158 as shown.

Figure 9A:
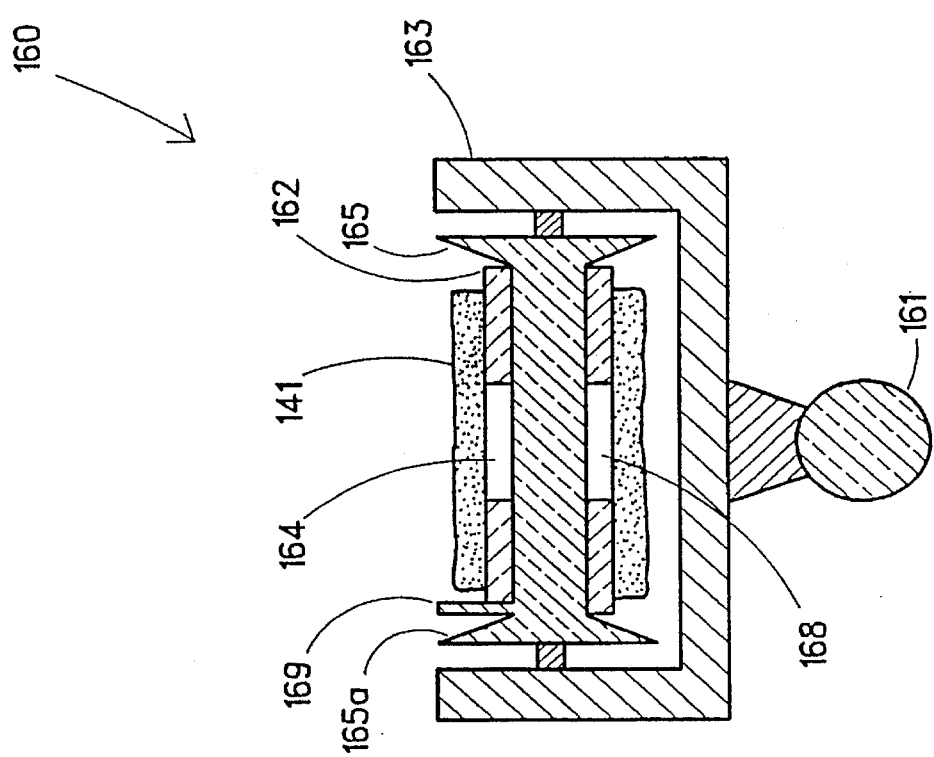
FIGS. 9A and 9B are a series of views of a transceiver collar.
Figures 9B, 9C:
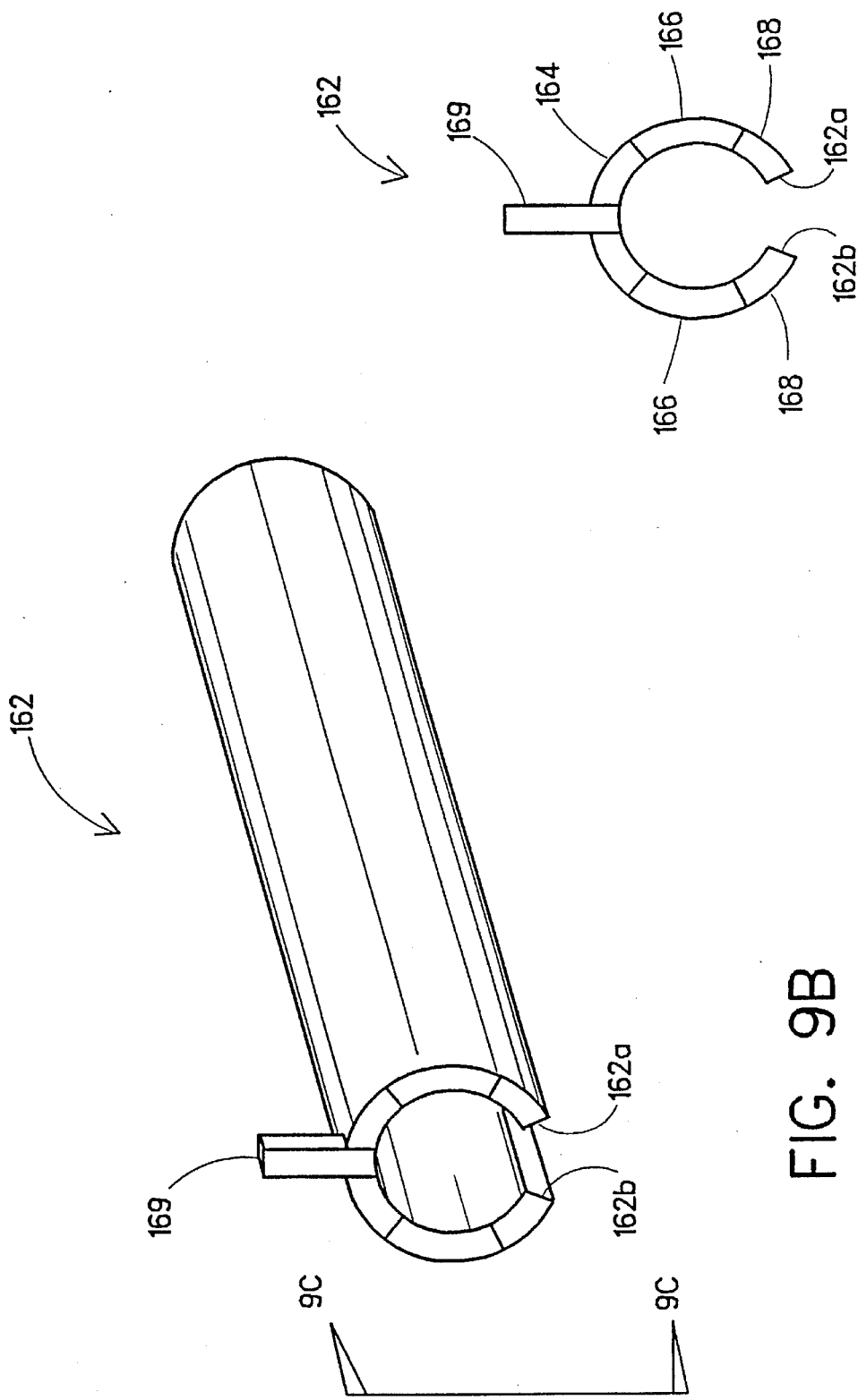
FIG. 9C is an end view of the transceiver collar of FIG. 9B.

Referring now to FIGS. 9A–9C in which like elements are provided having like reference designations, a fishing reel 160 disposed on a fishing rod includes a frame 163 and a base 163a coupled to the fishing rod 161. A collar 162 having a transmitter 164 disposed in a cavity region thereof is disposed over a spool 165. A signal is fed from a sensor (not shown) to the transmitter 164 via the fishing line 141 here shown wrapped around the collar 162 and spool 165. However, the transmitter 164 disposed in the collar 162 then transmits the signal to a receiver which may be provided as a receiver headset (not shown) worn by the angler for example. The transmitter 164 may emit an RF signal which propagates through the air to the receiver headset. Thus no physical connection through wires or lines are required between the transmitter and headset.

As may be more clearly seen in FIGS. 9B and 9C, the collar 162 may be provided from a semi-flexible material or a modular hard material having an annular C-shaped cross section and having a plurality of cavity regions. The collar 162 is here provided having two spaced edges 162a, 162b. The material from which the collar is provided should be flexible enough such that the edges 162a, 162b may be separated a sufficient distance apart to allow the collar 162 to be disposed about the spool 165. A modular hard material may be coupled to the collar 162 to close the spaced region between the edges 162a, 162b such that the fishing line is not wound around an eccentric base.

In an alternate embodiment, the collar 162 may be provided having a hinged side such that the collar may be opened an placed around the fishing reel spool. When the collar 162 is closed about the spool a latching mechanism disposed on the collar 162 prevents the collar from inadvertently opening.

Disposed in a first cavity region is a transmitter circuit 164. Disposed in second and third cavity regions are power sources 166 which may be provided as batteries having a low height profile. A plurality of weights 168 may be disposed in the remaining cavities of the collar 162. The weights are selected to properly balance the collar prior to placing the collar over the spool of the reel. Since the spool spins it is desirable to maintain a particular weight distribution around the spool to thus allow the spool to rotate uniformly.

The collar further includes a switch mechanism 169 to switch the transmitter on and off as desired. Those of ordinary skill in the art will appreciate of course that the switch mechanism 169 may be positioned flush with the side wall surface 165a (FIG. 9A) of the spool 165 (FIG. 9A) such that the switch mechanism 169 does not obstruct the fishing line.

Those of ordinary skill in the art will also appreciate that the receiver may also be disposed in a cavity of the reel rather than in a collar.

Figure 10:
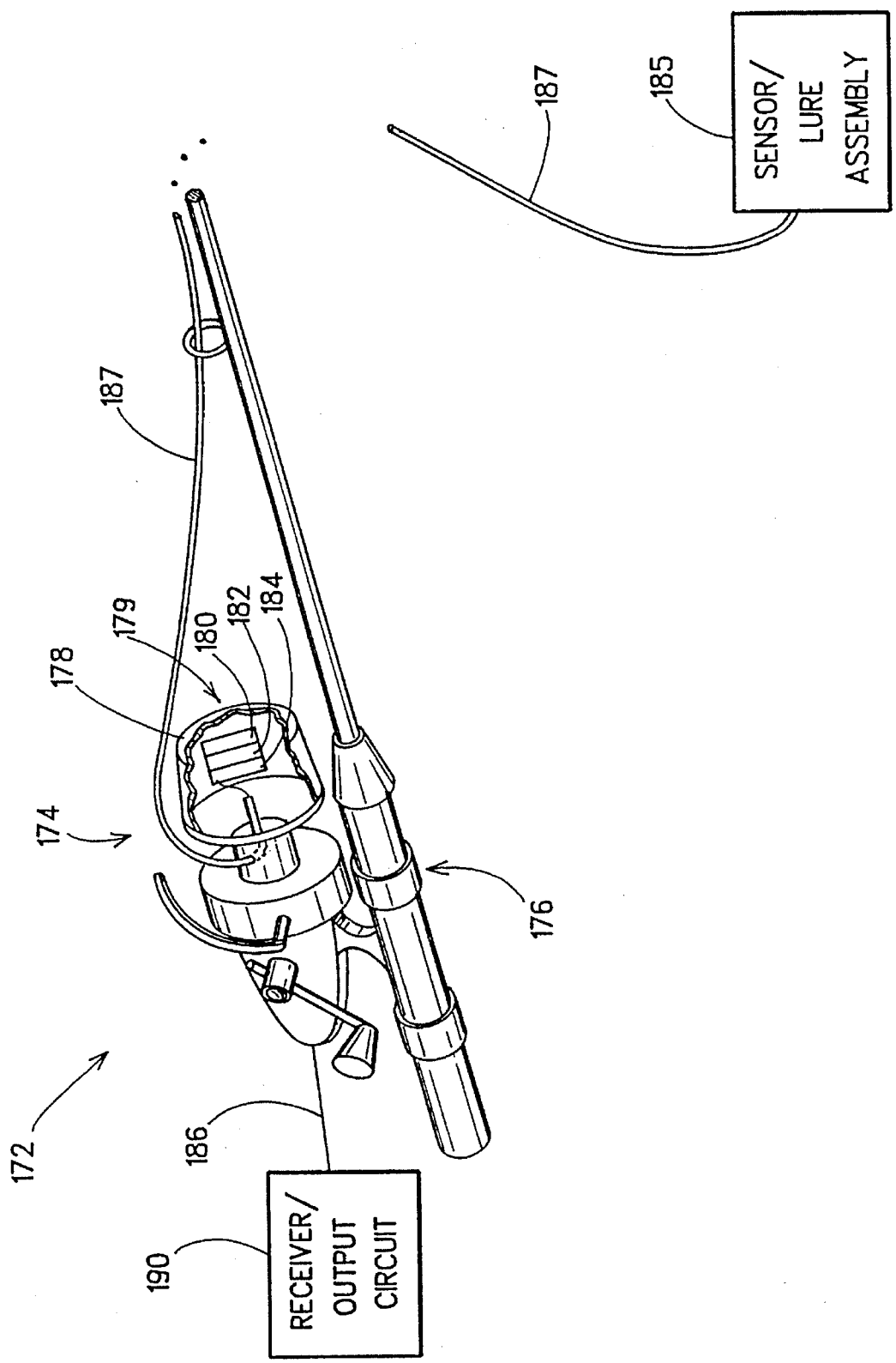
FIG. 10 is a fishing reel having a receiver/transmitter assembly mounted thereon.

Referring now to FIG. 10, a fishing detection system 172 includes a fishing reel 174 coupled to a fishing rod 176. The fishing reel 174 includes a dome shaped housing 178. Here a portion of the dome shaped housing 178 has been removed to expose an electronics assembly 179 including a power source 180, a receiver 182 and a transmitter 184. Here the transmitter 184 is provided as an FM transmitter.

The electronics assembly is coupled to a sensor/lure assembly 185 via a fishing-transmission line 187 which may be of one of the types described above in conjunction with FIGS. 7 and 7A.

The transmitter 182 transmits a signal to a receiver/output circuit 190. Such transmission may be provided as a wireless RF transmission or alternatively may be accomplished through an optional transmission line 186. In the embodiment where the output line 186 is used the line 186 may be fed from the electronics assembly 179 through the fishing reel body 188 to the receiver/output circuit 190. The output circuit may include 190, for example, a set of headphones as described in conjunction with FIGS. 6 and 8 above.

Figure 11:
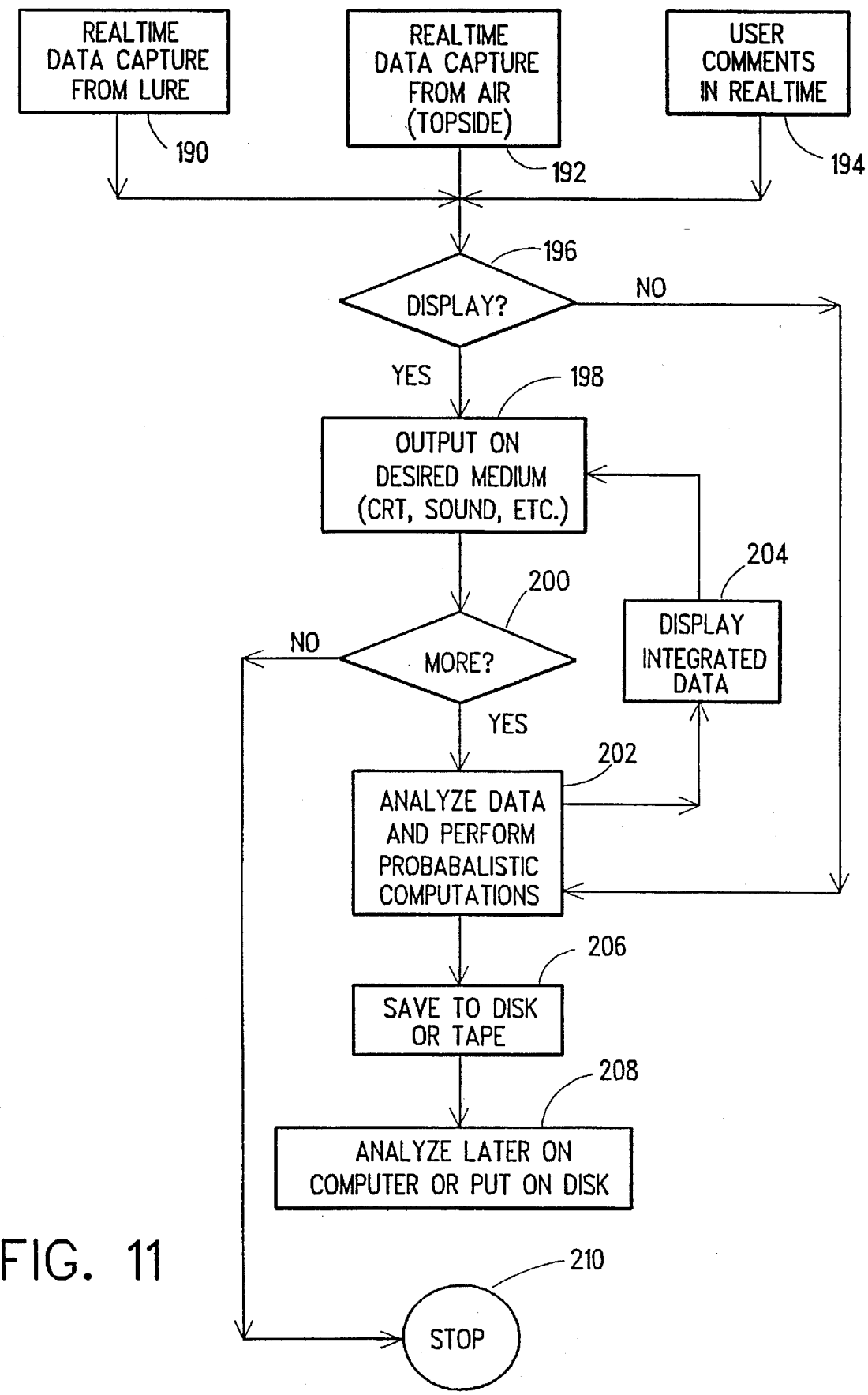
FIG. 11 is a flow diagram of the operating steps of a fish detecting system.

FIG. 11 shows a flow diagram of the steps performed in the processor 28 (FIG. 1) of the fish detection system 10 (FIG. 1) to produce an output on the display 20 (FIG. 1).

In the flow diagram, the rectangular elements (typified by element 190) herein denoted "processing steps" represent instructions or groups of instructions. The diamond-shaped elements (typified by element 196) herein denoted "decision steps" represent instructions or groups of instructions which affect the execution of the instructions represented by the processing steps.

Turning now to FIG. 11, in processing step 190 data is collected by a lure/sensor assembly 13 (FIG. 1). As described above in conjunction with FIG. 1, the below surface sensor assembly 13 may be provided having one or a plurality of sensors 15a–15N. Each of the sensors 15 may be selected to detect below surface characteristics including, but not limited to, temperature, oxygen content of the water, pressure, light penetration, light color and pH of the water.

Furthermore, the sensor assembly 13 may also be provided having an active sonar system disposed therein. Thus, the range and bearing of an object in the proximity of the lure 9 (FIG. 1) may be determined.

Other subsurface sensors to detect speed of the detector assembly, the position of the detector in the water, compass bearings, motion detection, lure angle/balance and moisture detection may also be used.

Simultaneously with the below surface data collection, data may also be collected from the above surface sensor module 26 (FIG. 1). Similarly, the above surface sensor module 26 may be selected to record the ambient conditions including, but not limited to, light levels, temperature, pressure, precipitation, positional information provided from a global positioning system, etc. . . .

Furthermore, as shown in processing block 194, the processor 28 may be used to record the date and time, and may allow other comments to be input by a user. For example, a user may input comments such as preceding or present weather conditions, location, etc. . . .

In decision block 196 the decision is made as to whether data collected by the below surface sensor assembly and/or the above surface sensor assembly should be displayed. If decision is made to output data then the data is output on the desired media as shown in processing block 198. If decision is made not to output data then processing continues to processing block 202 where data is analyzed and computations such as probabilistic computations, for example, may be performed.

Upon completion of data computation and analysis in processing block 202 then data is displayed as shown in processing block 204. Processing then continues to decision step 200 where decision is made to continue process in processing block 202 or whether to stop at processing step 210.

If processing continues to processing step 202 from decision block 200 then processing continues to processing step 206 where data is saved on a storage medium such as disk or magnetic tape. Processing may then be performed at a later time as shown in processing block 208.

Figure 12:
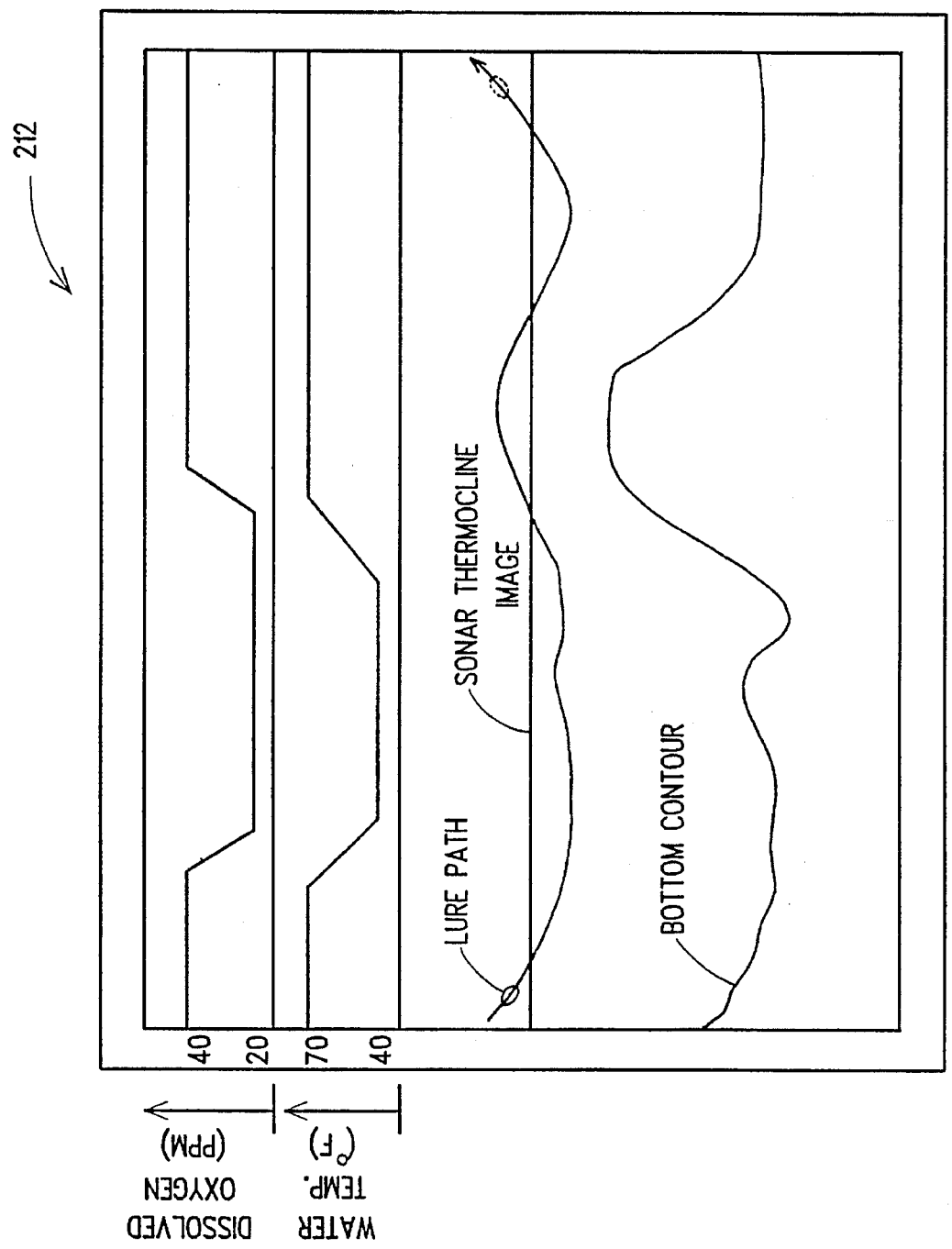
FIG. 12 is an output monitor having a plot of integrated data provided from a detection system which may be of the type described in conjunction with FIG. 1.

Referring now to FIG. 12 an above surface monitor 212 simultaneously displays data measured by a sensor/lure assembly which may be of the type described in conjunction with FIG. 1 for example. Here, the monitor 12 simultaneously displays plots of water temperature, water oxygen content, lure path and bottom contour at each point in the lure's retrieve path. As the lure drops below the thermocline, temperature and oxygen dioxide levels change. The above surface display 212 may be disposed on a boat, on a stand, a fishing rod or held by or attached to the angler. The monitor 212 may display the speed and depth of the lure, as well as all the other factors such as water pH over the distance which the lure travels while the angler retrieves the lure. Furthermore, topside data and user comments may also be displayed.

Figure 12A:
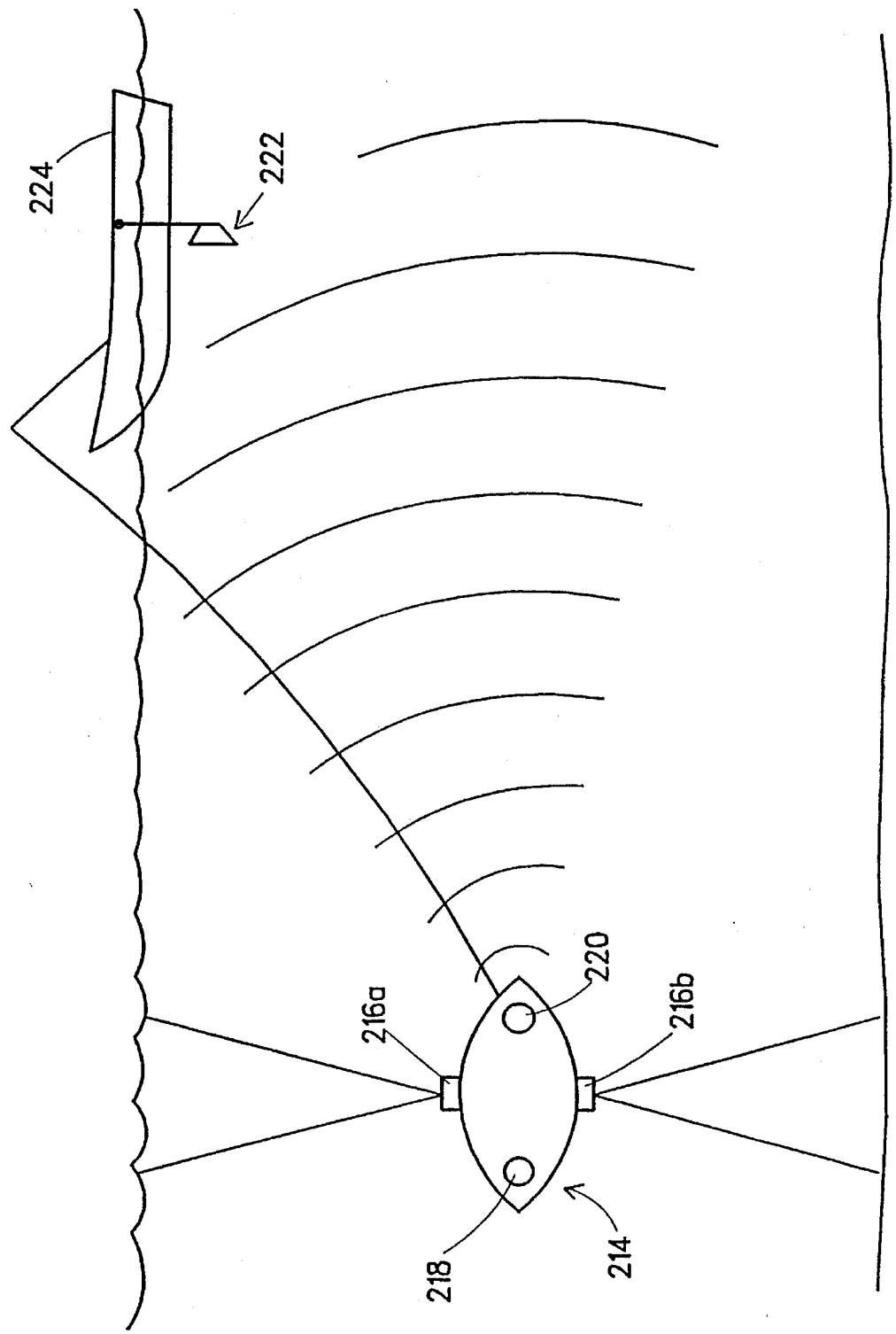
FIG. 12a is a diagrammatic view of a sensor/lure assembly which may be used to provide data to the output monitor of FIG. 12.

As may be more clearly seen in FIG. 12A, to provide simultaneous plots of such data, a lure 214 includes first and second sonar transducers 216a, 216b. The first sonar transducer 216a measures the distance from the lure 214 to the water surface and the second transducer 216b measures the distance from the lure 212 to the ocean bottom. The lure 214 further includes a water pressure gauge 218 and an electronic ranging beacon 220 which transmits distance information computed by the first and second sonar transducers 216a, 216b to a receiver 222 disposed in the water proximate a boat 224 in which an angler is located. Thus, the path of the lure 214 may be charted by a combination of sonar aimed up and down, water pressure and lure position beacon.

Having described preferred embodiments of the invention, it will now become apparent to one of skill in the art that other embodiments incorporating the concepts may be used. It is felt, therefore, that these embodiments should not be limited to disclosed embodiments but rather should be limited only by the spirit and scope of the appended claims.

What is claimed is:

1. A fishing lure comprising:

a plurality of sensors, disposed on the lure, for sensing the presence of an object about the lure, each of said sensors for providing at least one sensor signal to indicate the presence of the object;

a first transmitter, disposed on the lure and coupled to each of said plurality of sensors, said transmitter for receiving each of the sensor signals from said plurality of sensors and for transmitting a transmitter signal corresponding to said sensor signals wherein a first one and a second one of said plurality of sensors are provided as image sensors, said first image sensor having a field of view disposed in a first direction and said second image sensor having a field of view disposed in a second direction; and a display, wherein said first and second image sensors provide video sensor signals to said display.

2. The fishing lure of claim 1 wherein said first transmitter is a first one of a plurality of transmitter s each of said transmitters disposed on the lure and each of said transmitters coupled at least to a corresponding one of said plurality of sensor and each of said plurality of transmitters for transmitting a transmitter signal corresponding to the sensor signal received from the corresponding one of said plurality of sensors.

3. The fishing lure of claim 2 wherein at least two of said plurality of sensors are disposed on said lure to sense the presence of objects in different directions.

4. The fishing lure of claim 2 wherein each of said plurality of sensors provides a sensor signal to indicate the presence of the object.

5. The fishing lure of claim 2 wherein at least one of said plurality of sensors provides a sensor signal corresponding to an ambient condition of the surrounding environment in which the lure is disposed.

6. The fishing lure of claim 1 further comprising a light coupled to said lure for illuminating at least a portion of a region in the field of view of at least one of said first and second video sensors.

7. A fishing lure comprising:

a plurality of sensors, disposed on the lure, for sensing the presence of an object about the lure, each of said sensors for providing at least one sensor signal to indicate the presence of the object; and a rotatable platform disposed on the lure wherein at least one of said plurality of sensors is disposed on said rotatable platform and wherein said rotatable platform rotates to direct the at least one sensor in different directions such that the at least one sensor may sense the presence of objects in different directions.

8. A fishing lure comprising:

a plurality of sensors, disposed on the lure, for sensing the presence of an object about the lure, each of said sensors for providing at least one sensor signal to indicate the presence of the object;

a first transmitter, disposed on the lure and coupled to each of said plurality of sensors, said transmitter for receiving each of the sensor signals from said plurality of sensors and for transmitting a transmitter signal corresponding to said sensor signals wherein a first one and a second one of said plurality of sensors are provided as audio sensors and are disposed on first and second opposing surfaces of the lure; and an audio output circuit, wherein said first and second audio sensors provide audio sensor signals to said audio output circuit.

9. A fishing lure comprising:

a sensor, disposed on the fishing lure, for sensing the presence of an object about the fishing lure and for providing a sensor signal to indicate the presence of the object;

a transmitter, disposed on the fishing lure and coupled to said sensor, said transmitter for receiving the sensor signal from said and for transmitting a transmitter signal corresponding to said sensor signal; and a rotatable platform disposed on the fishing lure wherein said sensor is disposed on said rotatable platform and wherein said rotatable platform rotates to direct said sensor in different directions such that said sensor may sense the presence of objects in different directions.

10. The fishing lure of claim 10 further comprising:

a second sensor disposed on said lure, wherein said first and second sensors are provided as image sensors each of said image sensors having a field of view and each of said image sensors having their field of view respectively disposed in first and second directions; and a display, wherein said first and second image sensors provide video sensor signals to said display.

11. The fishing lure of claim 10 further comprising a light coupled to said lure for illuminating at least a portion of a region in the field of view of at least one of said first and second image sensors.

12. The fishing lure of claim 9 further comprising:

a second sensor disposed on said lure, wherein said first and second sensors are provided as audio sensors and are disposed on first and second opposing surfaces of said lure; and an audio output circuit, wherein said first and second sensors provide audio signals to audio output circuit.

13. A fishing lure comprising:

a lure body;

a microphone, coupled to said lure body, for receiving sound signals in a region about said lure body and in response to receiving a sound signal for providing an audio output signal to a user; and a rotatable platform wherein said microphone is disposed on said rotatable platform and wherein said platform rotates to point said microphone in different directions such that said microphone senses the presence of objects in different directions.

14. The fishing lure of claim 13 wherein the audio output signal provided by said microphone indicates the presence of an object.

15. The fishing lure of claim 14 wherein said microphone is disposed on said lure body.

16. The fishing lure of claim 15 further comprising:

an audio output circuit, coupled to said microphone wherein said microphone provides an audio signal to said audio output circuit.

17. The fishing lure of claim 16 further comprising a transmitter coupled to said lure body and coupled between said microphone and said audio output circuit, said transmitter for receiving a first signal from said microphone and for transmitting a second signal to said audio output circuit.

18. The fishing lure of claim 13 wherein said microphone is a first sensor of a plurality of sensors each of said plurality of sensors coupled to said lure body, wherein each of said plurality of sensors provides a sensor signal to indicate the presence of the object and wherein at least two of said plurality of sensors are disposed on said lure to sense the presence of objects in different directions.

19. The fishing lure of claim 18 wherein at least one of said plurality of sensors provides a sensor signal corresponding to an ambient condition of the surrounding environment in which the lure is disposed and wherein said transmitter is a first one of a plurality of transmitters each of said transmitters disposed on the lure and each of said transmitters coupled at least to a corresponding one of said plurality of sensors and each of said plurality of transmitters for transmitting a transmitter signal corresponding to the sensor signal received from the corresponding one of said plurality of sensors.

* * * * *